(12) United States Patent
Kadambe

(10) Patent No.: US 7,478,071 B2
(45) Date of Patent: Jan. 13, 2009

(54) METHOD AND APPARATUS FOR DETERMINING AND ASSESSING INFORMATION TO BE COLLECTED BASED ON INFORMATION-THEORETIC MEASURES

(75) Inventor: Shubha Kadambe, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1423 days.

(21) Appl. No.: 10/171,280

(22) Filed: Jun. 11, 2002

(65) Prior Publication Data

US 2003/0023534 A1 Jan. 30, 2003

Related U.S. Application Data

(60) Provisional application No. 60/297,683, filed on Jun. 11, 2001.

(51) Int. Cl.
*G06Q 99/00* (2006.01)
(52) U.S. Cl. .......................... 705/500; 705/35
(58) Field of Classification Search ............. 705/1, 705/7–10, 35–36 R, 500; 375/229–233; 707/1–6
See application file for complete search history.

(56) References Cited

U.S. PATENT DOCUMENTS

| | | | | | |
|---|---|---|---|---|---|
| 5,325,445 | A | * | 6/1994 | Herbert | 382/225 |
| 5,715,821 | A | * | 2/1998 | Faupel | 600/302 |
| 5,799,287 | A | * | 8/1998 | Dembo | 705/36 R |
| 5,801,970 | A | * | 9/1998 | Rowland et al. | 703/6 |
| 5,999,893 | A | | 12/1999 | Lynch, Jr. et al. | |
| 6,038,512 | A | | 3/2000 | Williams | |
| 6,119,111 | A | | 9/2000 | Gross et al. | |
| 6,421,655 | B1 | * | 7/2002 | Horvitz et al. | 706/61 |
| 6,509,871 | B2 | * | 1/2003 | Bevington | 342/373 |
| 6,629,088 | B1 | * | 9/2003 | Rising, III | 706/12 |
| 7,020,701 | B1 | * | 3/2006 | Gelvin et al. | 709/224 |
| 2003/0036890 | A1 | * | 2/2003 | Billet et al. | 703/2 |
| 2003/0065535 | A1 | * | 4/2003 | Karlov et al. | 705/2 |

OTHER PUBLICATIONS

Sengupta, Jati K., "Econometrics of Information and Efficiency," Springer, 1993, pp. 13-16, 152-153 and 160.*
A. Papoulis, "Probability, Random variables and Stochastic Processes," Second edition, McGraw Hill 1984, pp. 500-567.

(Continued)

*Primary Examiner*—Mary Cheung
(74) *Attorney, Agent, or Firm*—Tope-Mckay & Associates

(57) ABSTRACT

A method, apparatus, and computer program product for determining and assessing information for collection from information sources for a desired level of decision accuracy are presented. Operations include: receiving a partial set of information; performing a minimax entropy-based test to determine a source with useful information; performing a mutual information or a conditional entropy-based test check minimax test validity. With an invalid result, the information source is excluded from further consideration and the minimax test is repeated; with a valid result, a cost/benefit analysis is determines whether to gather the information. If the cost/benefit analysis succeeds, the information is gathered. Otherwise, the information source is excluded and the minimax test is performed again. A consistency check ensures validity of the information prior to restarting the process. Thus, the set of information is iteratively augmented until there is no information to add or until adding information would be cost-prohibitive.

96 Claims, 15 Drawing Sheets

OTHER PUBLICATIONS

R. Battti, "Using mutual information for selecting features in supervised neural net learning," IEEE Trans. On Neural Network, vol. 5, No. 4, Jul. 1994, pp. 537-550.

S. C. A. Thomopoulos, "Sensor selectivity and intelligent data fusion," Proc. Of the IEEE MIT'94, Oct. 2-5, 1994, Las Vegas, NV, pp. 529-537.

G. A. Darbellay, I. Vajda, "Estimation of the information by an adaptive partitioning of the observation space," IEEE Transactions on Information Theory, vol. 45, No. 4, May 1999, pp. 1315-1321.

H.-P. Bernhard and G. A. Darbellay, "Performance analysis of the mutual information function for nonlinear and linear signal processing" Proc. Of ICASSP '99, vol. 3, 1999, pp. 1297-1300.

W. H. Press, S. A. Teukolsky, W. T. Vetterling and B. P. Flannery, "Numerical Recipes in C," Cambridge University Press, 1992, pp. 632-635.

L. R. Rabiner and B-H. Juang, "Findamentals of Speech Recognition," Prentice Hall, 1993, Chapter 6.

T. Pun, "Entropic thresholding: A new approach," Signal processing, vol. 2, 1981, pp. 210-239.

* cited by examiner

METHOD AND APPARATUS FOR DETERMINING AND ASSESSING INFORMATION TO BE COLLECTED BASED ON INFORMATION-THEORETIC MEASURES

PRIORITY CLAIM

This application claims the benefit of priority to provisional application 60/297,683, titled Information "Information Theoretic Based Feature Discovery, Information Fusion and Sensor Discrimination", filed with the United States Patent and Trademark Office on Jun. 11, 2001.

BACKGROUND (1) Technical Field

The present invention relates to techniques for determining and assessing the quality of missing information for decision-making. More specifically, the present invention relates to techniques for feature discovery and information source discrimination to assist in efficiently and cost effectively gathering information for decision-making processes (e.g., classification).

(2) Discussion

Typically classifiers are queried with a complete input description and respond by predicting a class membership (e.g. query: "furry", "alive", "has a heart"; response: "mammal"). This framework is passive in nature. That is, the classifier behaves as if it has no control over what information it receives.

In contrast, the majority of real-world classification operations involve extensive decision-making and active information gathering. For example, a doctor trying to diagnose a patient must decide which tests to perform based on the expected costs and benefits of the tests. The doctor is not given a static and complete featural description of a patient's state. Instead, the doctor must actively gather information. Furthermore, the doctor cannot gather every possible piece of information about the patient. Cost issues rule out this possibility.

The same general principal applies to any situation where a partial information set exists and the gathering of further information has the potential to become cost-prohibitive. Examples of such systems and their underlying cost-basis include radar systems for classifying objects, where energy expended, radar antenna allocation, risk of source detection, and time are example cost factors; medical diagnosis, as previously mentioned, where financial cost, risk to patient well-being, and time are example cost factors; and investment/economic recommendation systems, where financial cost and time are example cost factors.

In addition to the above situations, scenarios involving spatially distributed networks of inexpensive, small and smart nodes with multiple onboard sensors are an important class of emerging networked systems for a variety of defense and commercial applications. Since a network of sensors often has to operate efficiently in adverse environments using limited battery power and resources, it is important that these sensors process information hierarchically and share information such that a decision is made progressively. It would be desirable to address this problem by activating only those nodes that can provide relevant information to aid in progressive decisions. However, techniques developed to-date for feature selection are generally static in nature in that they select a subset of features from a larger set and perform classification operations thereon without being able assess and verify the cost/benefit of the information provided.

Thus, a need exists for a system that aids in classification tasks in which the available information is incomplete and where it is desirable that the system gather further information efficiently in a cost beneficial way to aid in optimum classification/decision-making. It would be desirable that such a system perform an accurate cost/benefit analysis of possible information sources in order to determine the next information to gather in order to augment a set of partial information to achieve a desired classification accuracy level.

The following references are provided as additional general information regarding the field of the invention.

1. R Battti, "Using mutual information for selecting features in supervised neural net learning," IEEE Trans. On Neural Network, vol. 5, no. Jul. 4, 1994, pp. 537-550.

2. S. C. A. Thomopoulos, "Sensor selectivity and intelligent data fusion," Proc. Of the IEEE MIT'94, Oct. 2-5, 1994, Las Vegas, Nev. pp. 529-537.

3. J. Manyika and H. Durrant-Whyte, "Data fusion and sensor management: An information thoretic approach," Prentice Hall, 1994.

4. J. N. Kapur, "Measures of information and their applications," John Wiley, Eastern Limited, 1994.

5. T. Pan, "Entropic thresholding: A new approach," Signal processing, Vol. 2, 1981, pp. 210-239.

6. A. Papoulis, "Probability, Random variables and Stochastic Processes," Second edition, McGraw Hill 1984, pp. 500-567.

7. G. A. Darbellay, I. Vajda, "Estimation of the information by an adaptive partitioning of the observation space," IEEE Transactions on Information Theory, vol. 45, no. May 4, 1999, pp. 1315-1321.

8. L. R. Rabiner and B-H. juang, "Findamentals of Speech Recognition," Prentice Hall, 1993, Chapter 6

9. H.-P. Bernhard and G. A. Darbellay, "Performance analysis of the mutual information function for nonlinear and linear signal processing" Proc. Of ICASSP '99, vol. 3, 1999, pp. 1297-1300.

10. W. H. Press, S. A. Teukolsky, W. T. Vetterling and B. P. Flannery, "Numerical Recipes in C," Cambridge University Press, 1992, pp. 632-635.

SUMMARY OF THE INVENTION

The present invention provides techniques for determining and assessing the quality of missing information for decision-making. More specifically, the present invention relates to entropy-based techniques for feature discovery and information source discrimination to assist in efficiently and cost effectively gathering information for decision-making processes (e.g., classification).

In one embodiment, the present invention provides a method for determining and assessing information to be collected from a set of information sources for a desired level of decision accuracy. First, a partial set of information is received from at least a subset of a plurality of information sources that provide information relevant to decision to be made. Next, a minimax entropy-based test is performed in order to determine an information source from which to next gather information that is most likely to improve the decision accuracy. After the minimax entropy-based test is completed, a check is performed using a mutual information entropy-based test or a conditional entropy-based test to determine whether the minimax entropy-based test generated a valid or an invalid result. When the minimax entropy-based test is determined to have generated an invalid result, the information source is excluded from the set of information sources to produce a set of remaining information sources. The minimax entropy-based test is then performed again on the remaining information sources. When the minimax entropy-based test is determined to have generated a valid result, a cost/benefit analysis is performed to determine whether the information should be gathered from the information source. On the other hand, when the cost/benefit analysis fails, the information source is excluded from further consideration and the minimax entropy-based test is repeated on the remaining information sources. When the cost/benefit analysis succeeds, the information is gathered from the information source.

After the information has been gathered, a consistency check is performed to determine the validity of the information gathered from the information source. When the consistency check fails, the information source is excluded from further consideration and the minimax entropy-based test is repeated on the remaining information sources. On the other hand, when the consistency check succeeds, the information is gathered from the information source and is added the information to the partial set of information to produce an augmented partial set of information. After this step, the method begins again with the step of performing the minimax entropy-based test on the augmented partial set of information. Thus, the partial set of information is iteratively augmented with additional information until there is no further information to add or until adding further information would be cost-prohibitive.

In a further embodiment, the information sources include a plurality of information sources selected from a group consisting of databases, sensors, and user inputs.

In a still further embodiment, the information sources include a plurality of sensors, and wherein the sensors are clustered into nodes. The nodes may be dormant, and the step of gathering the information can activate only the nodes from which the information is to be gathered. Furthermore, the nodes may be mobile, and may move to a location from which the information is to be gathered. In this case, the cost/benefit analysis may be based on factors that include the cost of moving the node from a present position versus the benefit of moving the node to a new location. In the case where the sensors are clustered onto nodes, the nodes may, for example, be objects selected from a group consisting of satellite nodes, terrestrial nodes, air-based nodes, and aquatic based nodes.

In a still further embodiment, the sensors may include sensors selected from a group consisting of seismic sensors, temperature sensors, acoustic sensors, infrared sensors, and radar sensors.

In another embodiment, the sensors are radar sensors and the information gathered is information regarding at least one object. In this case, the method further comprises a step of using the information gathered to determine an object classification for each object about which information was gathered. In one instance, the objects to be classified may be aircraft. As mentioned previously, the nodes may be dormant and the node or nodes from which information is to be gathered may be activated during the process of gathering the information.

In yet another embodiment, the information sources may be sensors that provide information regarding routing of network communications in a computer network, and the method may further comprise a step of using the information gathered to determine optimal paths for routing signals within the computer network. This embodiment may be applied to both wired and wireless networks.

In a further embodiment, the information sources may provide information for optimizing an investment portfolio, and the method may further comprise a step of using the information gathered to provide a recommendation regarding an investment to be made. The information sources, in this case, include databases of business-related information.

In another computer network-related embodiment, the sensors provide information regarding processing capabilities of a plurality of data processors in a distributed computing environment and about current processing jobs within the plurality of data processors. In this case, the method further comprises a step of using the information gathered to determine the processors to use for optimal processing of a new processing job.

In a still further embodiment, the information sources are selected from a group consisting of databases of marketing information and market studies to be performed by a user. In this case, the method further comprises a step of using the information gathered to make marketing-related recommendations.

In yet another embodiment, the information sources are medical information sources. In this case, the method further comprises a step of using the medical information gathered to diagnose a medical patient or to recommend a treatment for a medical patient. The cost/benefit analysis may be adjusted based on a factor selected from a group consisting of a patient's desires and the seriousness of a possible medical condition. In this situation, the user input may be the results of specific medical tests performed. It may also include information gathered from sensors in the form of automated medical tests.

In another embodiment, the sensors are configured for monitoring manufacturing activities, and the method further comprises a step of using the information gathered to allocate resources in a manufacturing process in order to optimize the use of resources in the manufacturing process.

Another embodiment of the present invention is useful for gathering and analyzing terrorist-related information. In this case, the information sources are terrorist-related data sources, and the method further comprises a step of using the information gathered to track potential terrorists.

In yet another embodiment of the present invention, the sensors provide feedback from individual ones of a plurality of engines on a vehicle, and the method further comprises a step of determining which engine or combination of engines to use for a particular maneuver of the vehicle.

In a still further embodiment of the present invention, the information sources provide information regarding resource allocation on a battlefield, and the method further comprises a step of using the information gathered to make recommendations regarding future resource allocation on the battlefield in order to optimize the use of resources on the battlefield.

In another embodiment, the present invention may be used to aid users in determining solutions to computer problems. In this case, the user input is information to aid in solving a computer problem, and the method further comprises a step of using the information gathered to make recommendations regarding the most likely way to correct the problem.

An apparatus for determining and assessing information to be collected from a set of information sources for a desired level of decision accuracy, the apparatus comprising a computer system including a processor, a memory coupled with the processor, an input coupled with the processor for receiving the information from the information sources, and an output coupled with the processor for outputting an output selected from a group consisting of a recommendation, a decision, and a classification based on the information collected, wherein the computer system further comprises means, residing in its processor and memory Each of the operations of the method discussed above typically corresponds to a software module or means for performing the function on a computer or a piece of dedicated hardware with instructions "hard-coded" therein. In other embodiments, the present invention provides an apparatus for determining and assessing information to be collected from a set of information sources for a desired level of decision accuracy. The apparatus comprises a computer system including a processor, a memory coupled with the processor, an input coupled with the processor for receiving the information from the information sources, and an output coupled with the processor for outputting an output selected from a group consisting of a recommendation, a decision, and a classification based on the information collected. The computer system may be a stand-alone system or it may be a distributed computer system. The computer system further comprises means, residing in its processor and memory for performing the steps mentioned above in the discussion of the method. In another embodiment, the apparatus may also include the information sources from which information is gathered.

In other embodiments, the means or modules (steps) may be incorporated onto a computer readable medium to provide a computer program product.

BRIEF DESCRIPTION OF THE DRAWINGS

The objects, features and advantages of the present invention will be apparent from the following detailed descriptions of the various embodiments of the invention in conjunction with reference to the following drawings.

DETAILED DESCRIPTION

Figure 1:
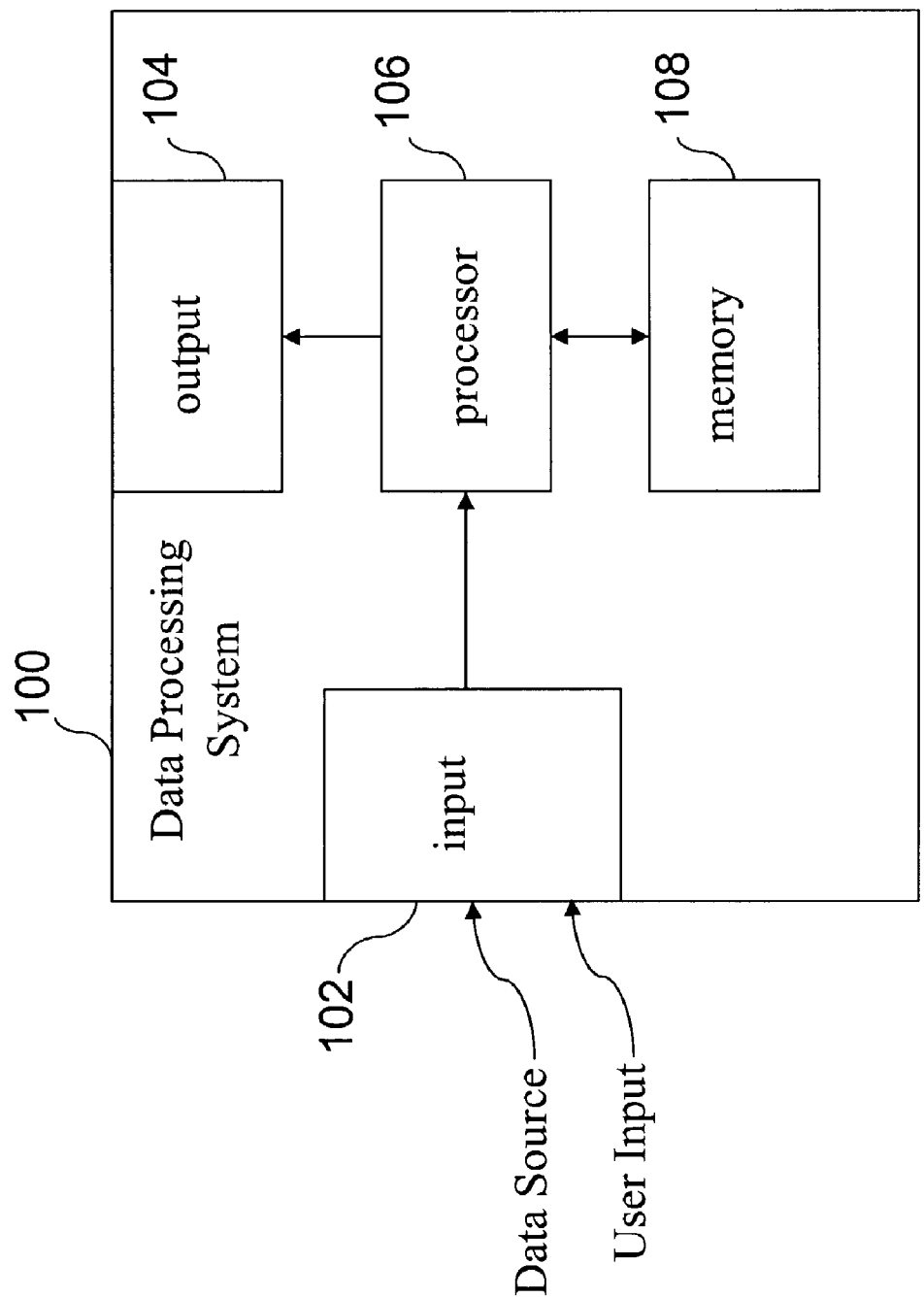
FIG. 1 is a block diagram depicting the components of a computer system used in the present invention.

The present invention relates to techniques for determining and assessing the quality of missing information for decision-making. More specifically, the present invention relates to techniques for feature discovery and information source discrimination to assist in efficiently and cost effectively gathering information for decision-making processes (e.g., classification). The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of embodiments. Thus, the present invention is not intended to be limited to the embodiments presented, but is to be accorded the widest scope consistent with the principles and novel features disclosed herein. Furthermore, it should be noted that, unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical embodiments of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Cost/Benefit Analysis—This term indicates a process wherein the cost of obtaining information is weighed against the benefit of obtaining the information in terms of improved decision accuracy. The term "benefit" is considered to be the improvement in decision-making/classification accuracy that results from the addition of a prospective piece of information to the incomplete set of information, whereas the term "cost" varies depending on the type of information sought. Non-limiting examples of costs include financial costs, time-related costs such as the cost of delays, opportunity costs, and risk-of-loss associated costs. The particular cost or costs associated with gathering various pieces of information from various information sources for a particular embodiment of the invention are used as factors in an overall cost/benefit analysis model/algorithm.

Information Source—As used herein, this term indicates any source from which data, generally digital data, is derived for use by the invention. Information sources may include those which provide information, also termed features, automatically as a result of a query, such results of automated chemical processes, results of queries to sensors such as radar, seismic, acoustic, IR, etc., results of database queries etc. Information sources may also include those that are continually active, such as speedometers and some always-on sensors or on/off sensors. Further, information sources may include explicit user input such as results of manually performed medical tests or results of market research studies performed at the request of the system.

Means—The term "means" as used with respect to this invention generally indicates a set of operations to be performed on, or in relation to, a computer. Non-limiting examples of "means" include computer program code (source or object code) and "hard-coded" electronics. The "means" may be stored in the memory of a computer or on a computer readable medium, whether in the computer or in a location remote from the computer.

Node—This term generally refers to a device upon which multiple sensors are clustered or to an information source.

Sensor—This term is generally used herein to define a device from which information is obtained for use by the present invention, and is considered to be an instance of the more general term "information source". Sensors may be of active or passive types, and may be used to gather a wide variety of information/feature types to aid in decision-making/classification. Sensors, as defined herein, can be any information gathering mechanism that does not require a user to explicitly enter the information into the system. Further, non-limiting examples of sensors, as defined herein, include automated testing equipment and databases.

User Input—User input is generally coined herein to indicate any information obtained for use by the present invention explicitly from a user. Most often herein, this term is used an instance of the more general term "information source". User input, however, may also be used for modifying the performance of the invention, for example, by setting cost/benefit thresholds or by indicating a satisfactory overall classification accuracy level.

(2) Physical Embodiments

The present invention has three principal "physical" embodiments. The first is a system for aiding in classification processes by determining the next information to gather for a desired level of classification accuracy/certainty, and is typically in the form of a computer system operating software or in the form of a "hard-coded" instruction set. The second physical embodiment is a method, typically in the form of software, operated using a data processing system (computer). The third principal physical embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. In addition to embodiments designed for producing jointly optimized filter sets, the present invention also encompasses the jointly optimized filter sets produced. These embodiments will be described in more detail below.

A block diagram depicting the components of a general or specific purpose computer system used in an embodiment the present invention is provided in FIG. 1. The data processing system 100 comprises an input 102 for inputting an incomplete set of information to be used for classification/decision-making. The input 102 is also used for receiving information from information sources to add to the incomplete set of information as a progressive classification/decision is made. The input 102 is connected with the processor 106 for providing information thereto. A memory 108 is connected with the processor 106 for storing data and software to be manipulated by the processor 106. An output 104 is connected with the processor for outputting information so that it may be further used in a decision-making/classification process. Note also, however, that the present invention may be applied in a distributed computing environment, where tasks are performed using a plurality of processors.

Figure 2:
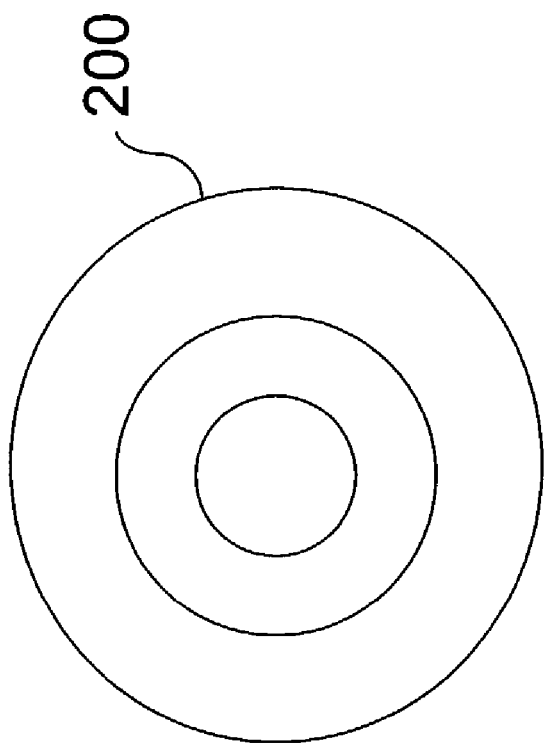
FIG. 2 is an illustrative diagram of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

(3) Introduction

The present invention is concerned with feature/missing information discovery and information source discrimination, and has many potential applications, including systems which gather information automatically such as sensor networks, systems which gather information through explicit user input, and systems which gather information both automatically and through explicit user input. A few, non-limiting, examples of specific applications to which the present invention may be applied include radar systems for classifying objects such as aircraft, medical diagnosis systems, computer games and simulators, systems for optimizing the allocation of wired and wireless network resources, investment and economic decision-making systems, aircraft or space guidance systems, educational testing systems, early earthquake detection systems, battlefield assessment and resource allocation systems, and manufacturing systems (e.g., diagnosis and Just-in-Time systems).

In particular, the present invention provides a dynamic system that uses information-theoretic-based metrics in order to assist in classification-related decisions. The information-theoretic-based metrics include a minimax entropy-based test, a mutual information entropy-based test or a conditional entropy-based test for feature/information discovery, information fusion, and information source discrimination. The invention uses these information-theoretic-based metrics in combination with a cost/benefit analysis and a set of partial information to determine which information to gather next based on a desired level of decision-making/classification accuracy.

An illustrative example of a situation in which the present invention may be of use involves a plurality of information sources in the form of a network of small spatially distributed nodes having multiple onboard sensors, considerable embedded processing and storage, and wireless communication capabilities. Nodes with these characteristics may be used in many potential commercial and military applications such as commercial airport monitoring for collision avoidance during take off and landing, target detection, location and tracking, remote sensing, and in surveillance and reconnaissance. In order for these nodes to operate efficiently both in terms of battery power and processing, it is important that they be used efficiently such that the information received from them is processed and fused collaboratively and hierarchically to make progressive decisions about the surrounding activity(ies). Because the sensors may be distributed in adverse environments, it is also necessary to check whether the information obtained from a sensor is useful or not. The present invention provides a practical solution for determining which sensor to activate (and when) in order to gather a desired piece of information, and to validate the feature set (information) received from the sensor. Decisions made using the present invention are based on cumulative knowledge in the sense that the system makes a decision with the goal of dynamically improving upon the sum of previous decisions. This has the advantage of dynamically discarding non-valid information, not activating unnecessary information sources, and making decisions that are progressive in nature. Since only the required sensor(s) is (are) activated this has the advantage of saving power, processing ability, and time.

The information theoretic approaches used in the present invention provide measures for relevance, utility, missing information, combining information, etc. These measures assist in achieving hierarchical extraction of relevant information to enable the selection/actuation of relevant information sources for progressive improvement of decision accuracy and confidence. As mentioned, the techniques used in this invention are dynamic in nature—as the system acquires information, it determines additional missing information (features) of importance, activates an appropriate sensor, decides whether the information obtained from the recently activated or queried information source is reliable (e.g. whether the information source itself is reliable), and checks whether it is appropriate to fuse the information for improving the previous decision accuracy. This has the advantage of discarding non-valid information dynamically and making progressive decisions.

Next, in the Discussion section, the details necessary for a general implementation of the present invention are provided. The Discussion section is followed by a section presenting several specific, non-limiting, examples of applications of the present invention, which, in turn, is followed by a brief discussion of an example set of experimental results derived from an embodiment of the present invention.

(4) Discussion

This discussion begins with the description of a flow diagram which presents the general steps that are performed by the present invention. Next, a section regarding the discovery of missing information using the minimax entropy-based test is presented. Then, a discussion about determining the relevance of the missing information based on the mutual information entropy-based test or the conditional entropy-based test is provided.

Figure 3:
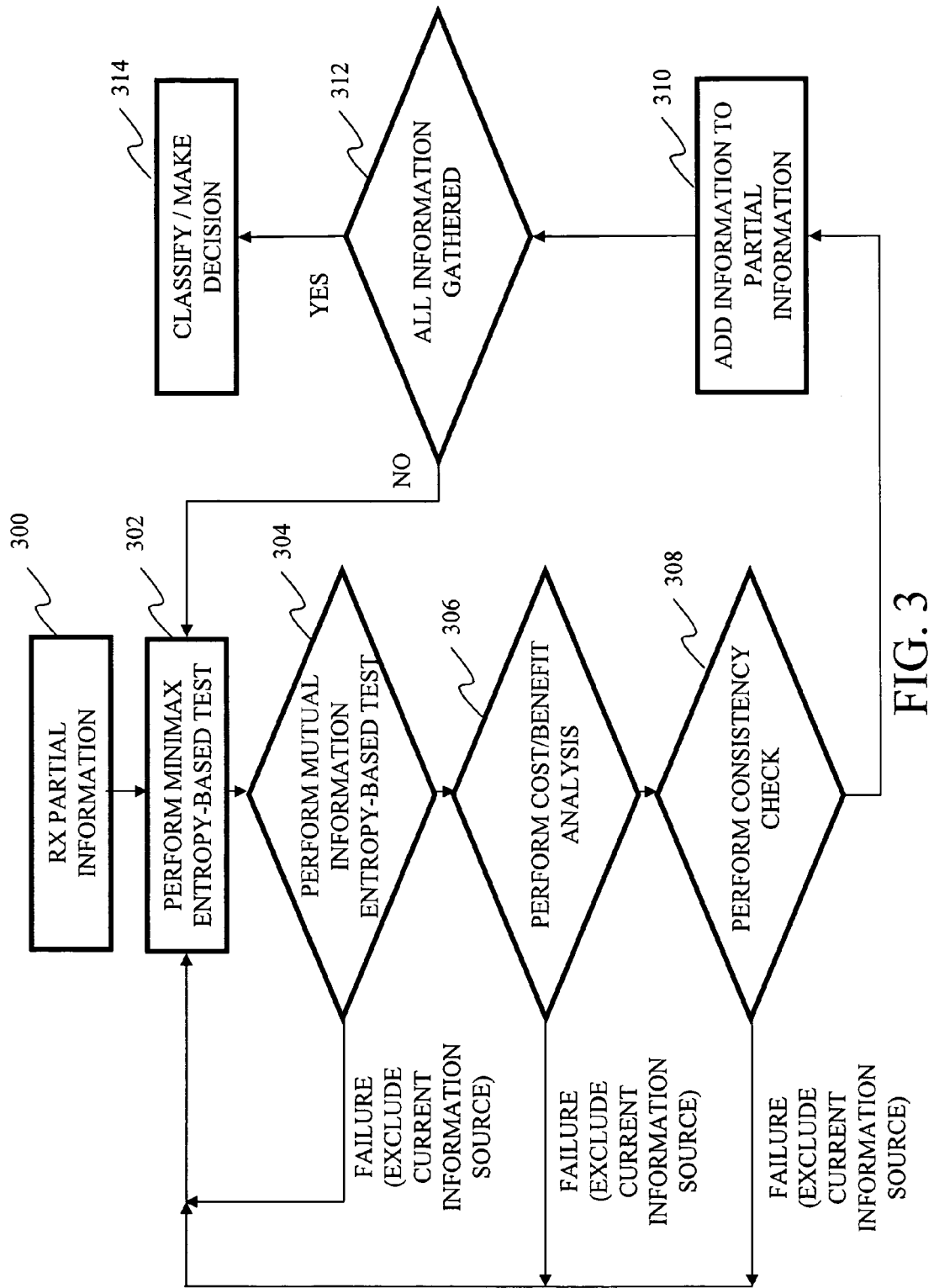
FIG. 3 is a flow diagram depicting the steps in an embodiment of the method of the present invention.

In order to provide a frame of reference for the rest of the discussion, a flow diagram is presented in FIG. 3, showing the general operations of the present invention. Each of the steps is described in greater detail further below. First, the system receives a set of partial information 300 and a set of potential information sources from which to gather missing information. Next, it performs a minimax entropy-based test 302 in order to determine the information source most likely to yield the best additional information to aid in classification/decision-making. A mutual information or conditional entropy-based test 304 is performed next as a check on the minimax entropy-based test 302 to further determine the likely value of the information sought. When the mutual information or conditional entropy-based test 304 fails, the information source is considered invalid and is excluded from further consideration. Thus, it is excluded from the set of information sources to be considered. If this is the case, the system begins again with the modified set of information sources by performing the minimax entropy-based test 302. If the mutual information or conditional entropy-based test 304 succeeds, the system then performs a cost/benefit analysis 306, weighing the likely value of the information, which was obtained from the mutual information or conditional entropy-based test 304, versus the cost of obtaining the information. If the cost/benefit ratio is less than a threshold, the system gathers the information and performs a consistency check 308 to ensure that the information is reliable (e.g. that there was no error in the information gathering process such as errors caused by a defective or dead sensor, a faulty test, an inaccurate assessment of its contribution, etc.). When the cost/benefit ratio exceeds the threshold, the information source is considered too expensive based on its potential value and is excluded from further consideration, and is thus excluded from the set of information sources to be considered. If this is the case, the system begins again with the modified set of information sources by performing the minimax entropy-based test 302. When the consistency check 308 fails, the information source is considered invalid and is excluded from further consideration. If this is the case, the system begins again with the modified set of information sources by performing the minimax entropy-based test 302. If the consistency check 308 succeeds, the information is considered beneficial and accurate, and it is added to the partial information 310, and the process begins again with this modified set of information sources by performing the minimax entropy-based test 302.

The system continues, repeating these steps until all valid and valuable information for which the cost/benefit ratio is acceptable is gathered 312. At that point, a classification/decision may be made 314 with the level of accuracy inherently set through the cost/benefit analysis 306 and checked by the consistency check 308.

With a general understanding of the operation of the present invention, further details regarding the operations discussed with regard to FIG. 3 are now presented.

(a) Discovery of Missing Information

For hierarchical processing, it is essential to check what information is missing. In example applications such as target detection, identification and tracking; classification; coalition formation, etc., the missing information could correspond to feature discovery. The present invention can improve system efficiency by only querying (awakening) an information source that can provide the missing information, thus conserving resources by not arbitrarily requesting information. The minimax entropy-based test utilizes the within-class and between-class entropy principle for information/feature discovery. The details of estimating missing information using the minimax entropy principle are discussed below. It is noteworthy that the entropy definition used herein is a discrete version, and not the classical Shannon's information entropy, because the missing information to be estimated in general is discrete in nature. Further information regarding the discrete entropy definition may be found in "Measures of information and their applications," by J. N. Kapur, John Wiley, Eastern Limited, 1994, which is incorporated herein by reference as non-essential subject matter that may be of aid to a reader.

(i) The Minimax Entropy Principle

The purpose of this sub-section is to present general information regarding the minimax entropy principle in order to provide a general understanding prior to discussing its application for information discovery.

It is assumed that there are N values that correspond to n different information types, and that $z_{ij}$ is the $j^{th}$ member of $i^{th}$ information type (where "information type" is defined as a cluster of values that give similar information measures) so that $$j = 1, 2, \ldots, m_i; i = 1, 2, \ldots, n; \sum_{i=1}^{n} m_i = N.$$

Given the above definitions, the entropy for this type or class of information is $$H = -\sum_{i=1}^{n} \sum_{j=1}^{m_i} \frac{z_{ij}}{T} \ln \frac{z_{ij}}{T} \text{ where } T = \sum_{i=1}^{n} \sum_{j=1}^{m_i} z_{ij}.$$

Letting $$T_i = \sum_{j=1}^{m_i} z_{ij},$$

the equation for H may be re-written as:

$$H = \sum_{i=1}^{n} \frac{T_i}{T} H_i - \sum_{i=1}^{n} \frac{T_i}{T} \ln \frac{T_i}{T} = H_w + H_B,$$

where $$H_i = -\sum_{j=1}^{m_i} \frac{z_{ij}}{T} \ln \frac{z_{ij}}{T},$$

the entropy of values that belong to information type i.

In the equation above, $H_w$ and $H_B$ are defined as the entropy within classes (information types) and between classes, respectively. It is desirable for the types of information used to be as distinguishable as possible, and for information within each type to be as homogeneous as possible. The entropy is high if the values belonging to a type (class) represent similar information and is low if they represent dissimilar information. Therefore, it is desirable that $H_B$ be as small as possible and that $H_W$ be as large as possible. This framework is the principal of minimax entropy, which is used herein as the basis of the minimax entropy-based test.

(ii) Application of the Minimax Entropy Principle for Information Discovery

It is assumed that z is a value representing the missing information (feature) where T is the total of all known values such that the total of all values is T+z. It is further assumed that $T_I$ is the total of values that belong to the information type to which z may belong. $T_I$+z then represents the total value for that particular type of information. This leads to the following equations:

$$H = -\sum{}' \frac{z_{ij}}{T+z} \ln \frac{z_{ij}}{T+z} - \frac{z}{T+z} \ln \frac{z}{T+z}$$

$$H_B = -\sum{}'' \frac{T_i}{T+z} \ln \frac{T_i}{T+z} - \frac{T_i+z}{T+z} \ln \frac{T_i+z}{T+z}.$$

Here, $\Sigma'$ denotes the summation over all values of i and j, except those corresponding to the missing information and $\Sigma''$ denotes the summation over all values of i, except for the type to which the missing information belongs.

Thus, an estimate of z may be made by minimizing $H_B/H_w$ or by maximizing $(H-H_B)/H_B$. The estimates of z provide the expected missing information values (features) and information (feature) type. Thus, information/features as well as the information source from which it may be gathered can be discovered. This has the advantage being able to query or probe the appropriate information source without disturbing or otherwise manipulating other information sources. The transfer of information and probing can be achieved in a distributed network, for example, by using network routing techniques.

Before trying to use the newly acquired feature set, however, it is advisable to check the relevance of the feature set in terms of its expected improvement to the accuracy to aid in reducing the cost of processing. In a distributed network of sensors, for example, this has an added advantage of reducing the communication cost. The mutual information metric, described below, is used for determining the information's relevance in terms of its contribution toward improving the decision accuracy.

(b) Relevance in Terms of Decision Accuracy

The purpose of this sub-section is to provide information regarding the mutual information and conditional entropy in order to provide a general understanding prior to discussing its application for decision accuracy determination.

(i) General Discussion

Entropy is a measure of uncertainty. It is assumed that H(x) represents the entropy of previously observed events, and y represents the estimated missing information (discovered features) described above or a new event. The uncertainty (entropy) of x may be measured including y by using the conditional entropy which is defined as: $H(x/y)=H(x, y)-H(y)$ with the property that $0 \leq H(x/y) \leq H(x)$.

The conditional entropy H(x/y) represents the amount of uncertainty remaining about x after y has been observed. By definition, if the uncertainty is reduced, then there is information gained by observing y. Therefore, the relevance of y can be measured by using conditional entropy.

Another measure that is related to conditional entropy that one can use is the mutual information I(x,y) which is a measure of uncertainty that is resolved by observing y and is defined by $I(x, y)=H(x)-H(x/y)$. To explain how this measure can be used as a measure of relevance an example is provided below.

(ii) Feature Relevance Using Mutual Information as a Metric

For purposes of this discussion, it is assumed that there are two nodes. $A=\{a_k\}k=1,2,\ldots$ represents the set of information from node 1 and $B=\{b_l\}l=1,2,\ldots$ represents the set of information from node 2. Further, $p(a_i)$ represents the probability of feature $a_i$, and H(A), H(B), and H(A/B) represent the entropy corresponding to node 1; node 2; and node 1 given node 2; respectively. Then, $$H(A) = \sum_k p(a_k) \log\left(\frac{1}{p(a_k)}\right)$$

and $$H(A/B) = H(A, B) - H(B) =$$

$$\sum_l p(b_l) H(A/b_l) = \sum_l p(b_l) \sum_k p(a_k/b_l) \log\left(\frac{1}{p(a_k/b_l)}\right).$$

H(A) corresponds to the prior uncertainty and the conditional entropy H(A/B) corresponds to the amount of uncertainty remaining after observing features from node 2. The mutual information is defined as I(A, B)=H(A)−H(A/B), and corresponds to uncertainty that is resolved by observing B, in other words, features from node 2. From the definition of mutual information, it can be seen that the uncertainty that is resolved depends on the conditional entropy. Consider two types of information sources at node 2. Let the set of features of these two information sources be $B_1$ and $B_2$, respectively. If $H(A/B_1) < H(A/B_2)$, then $I(A, B_1) > I(A, B_2)$. This implies that the uncertainty is better resolved by observing $B_1$ as compared to $B_2$. This further implies that $B_1$ corresponds to information that is more relevant to information from sensor A than from sensor $B_2$, and thus helps in improving the decision accuracy of node 1. Therefore, features from information source $B_2$ should not be considered in information (data) fusion.

Note that even though in the above example only two node are considered for simplicity, this measure or metric is readily extensible to a greater number of information sources. In such a case, in the system, A would be a set of features that a node already has from other sensors and B would be a new feature set received from a different node from which the system has not previously received information.

(c) Entropy-Based Measure of Consistency

Consistency can also be defined in terms of the entropy. Assuming that there are N events (values) that can be classified in to m classes and assuming that an event $X_{ij}$ is the $j^{th}$ member of $i^{th}$ class where i=1,2, ..., m, j=1,2, ..., $n_i$, and $$\sum_{i=1}^m n_i = N,$$

the entropy for this classification is:

$$H = \sum_{i=1}^m \sum_{j=1}^{n_i} p(i) p(x_{ij}) \log\left(\frac{1}{p(i) p(x_{ij})}\right) = -$$

$$\sum_{i=1}^m \sum_{j=1}^{n_i} p(i) p(x_{ij}) \log(p(i) p(x_{ij}))$$

$$= -\sum_{i=1}^m p(i) \sum_{j=1}^{n_i} p(x_{ij}) \log(p(x_{ij})) - \sum_{i=1}^m p(i) \log(p(i)) \sum_{j=1}^{n_i} p(x_{ij})$$

$$= \sum_{i=1}^m p(i) H_i - \sum_{i=1}^m p(i) \log(p(i))$$

since $$-\sum_{j=1}^{n_i} p(x_{ij}) \log(p(x_{ij}))$$

is the entropy of a class i and $$\sum_{j=1}^{n_i} p(x_{ij}) = 1$$

$=H_{w+Hb}$ where $H_W$ is termed the entropy within classes and $H_b$ is termed the entropy between classes. Note that these definitions differ slightly from those presented above with respect to the discussion regarding the minimax entropy principle, but that they are still similar in concept. Note also that the minimax entropy measure, which uses both within and between class entropies, was used earlier in the estimation of missing information; but here, within-class entropy is defined as a consistency measure that can be used in sensor discrimination or selection. These two metrics have different physical interpretations and are used for different purposes.

The entropy $H_w$ is high if the values or events belonging to a class represent similar information and is low if they represent dissimilar information. This means $H_w$ can be used as a measure to define consistency. That is, if two or more sensor measurements are similar, then their entropy within classes, $H_w$, is greater than if they are dissimilar. Therefore, this measure can be used in sensor discrimination or selection.

Figure 4:
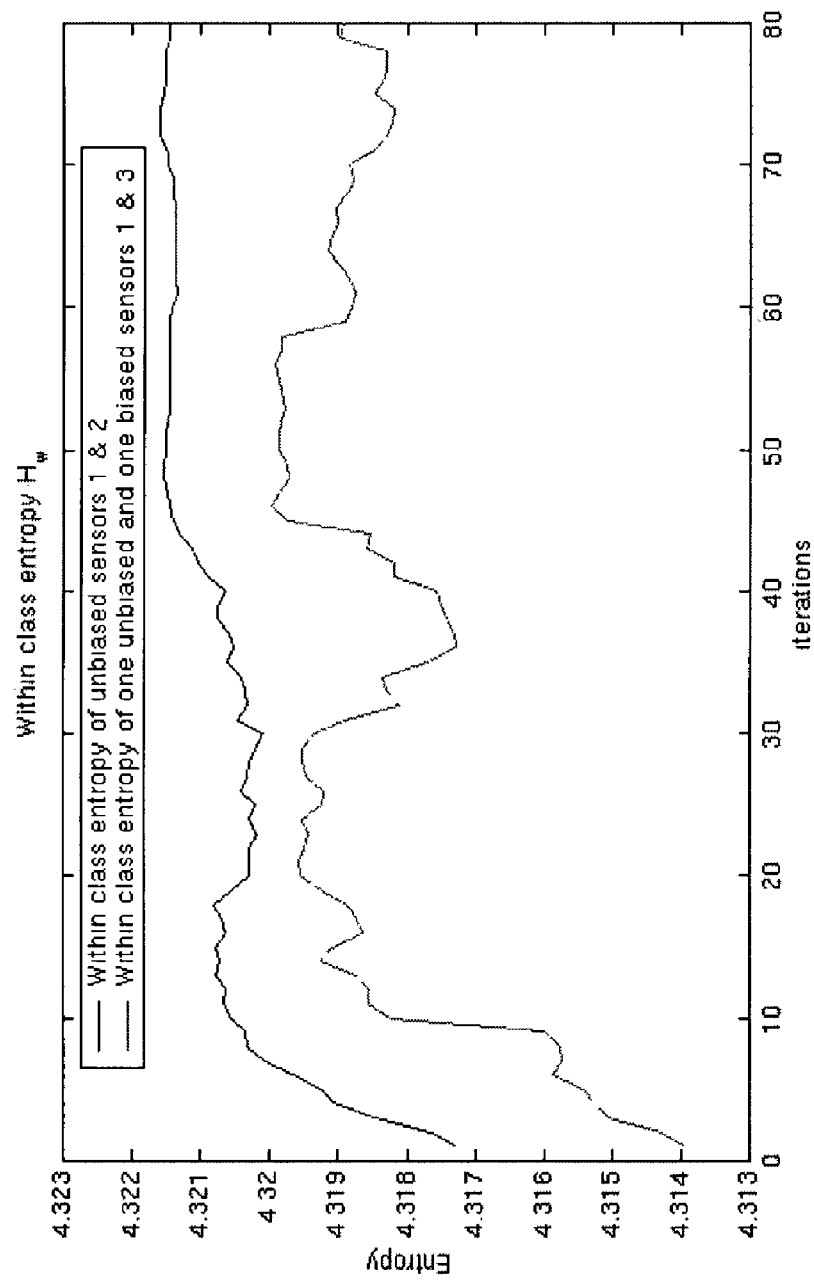
FIG. 4 is a graph plotting within-class entropy for two unbiased sensors and for one biased and one unbiased sensor, where the value of k was set to 1.0 in an example embodiment of the present invention.
Figure 5:
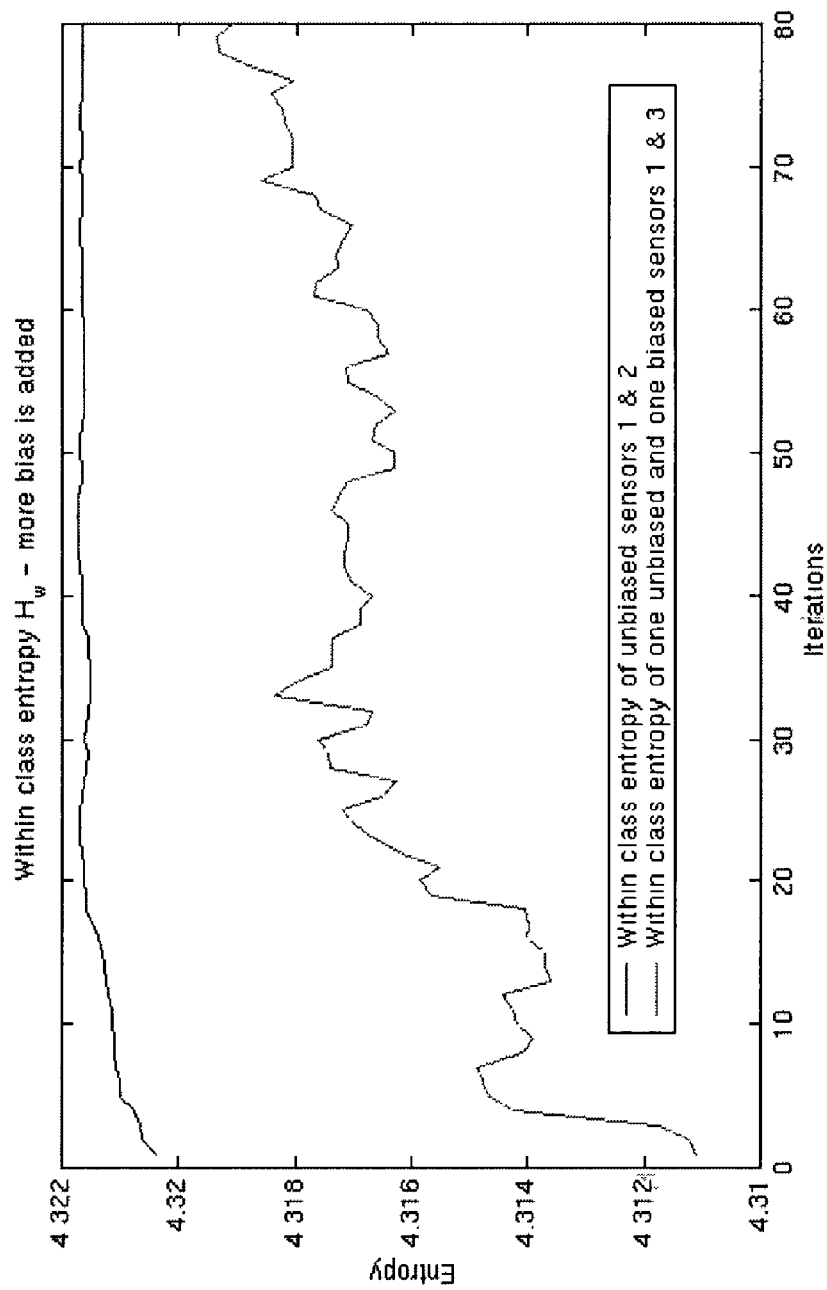
FIG. 5 is a graph plotting within-class entropy for two unbiased sensors and for one biased and one unbiased sensor, where the value of k was set to 2.0 in an example embodiment of the present invention.

The consistency measure described above has been applied for sensor discrimination or selection. For this, a network of radar sensors with biased and unbiased sensors was considered. The bias at one of the sensors was introduced as the addition of a random number to the true position of a target. The bias was introduced this way because the biases in azimuth and range associated with a radar sensor translate into a measured target position that is different from the true target position. In addition, it was assumed that the sensors measure the target's position in the Cartesian co-ordinate system instead of the polar co-ordinate system. Three sensors were considered—two were un-biased and one was biased. The amount of bias was varied by multiplying the random number by a constant k, i.e., measured position=(true position+k * randn)+measurement noise. In FIG. 4 and FIG. 5, within-class entropy was plotted for two unbiased sensors and for one biased and one unbiased sensor. The measurement noise level was kept the same for all three sensors. However, k was set to 1.0 in FIG. 4 and was set to 2 in FIG. 5. The within-class entropy was computed for different iterations using the definition provided in the previous section. The probability values needed in this computation were estimated using the histogram approach as described before. From these two figures, it can be seen that the within-class entropy of two unbiased sensors is greater than the within-class entropy of one biased and one unbiased sensors. This indicates that the within-class entropy can be used as a consistency measure to discriminate between sensors or to select sensors. Further information regarding this example is provided in section 5 below.

(5) Experimental Results

The present invention has been implemented and tested in the context of a simple network of radar sensors. It is important to note that the technique applied is general, and may be applied to a wide variety of scenarios with a wide variety of information sources. This example is provided merely to illustrate an application of the present invention.

The network of radar sensors in this example is used for tracking multiple targets. Each sensor node has local and global Kalman filter-based target trackers. As mentioned at the end of section 4(c), above, the target trackers estimate the target states (e.g., position and velocity) in a Cartesian coordinate system. The local tracker uses the local radar sensor measurements to make the state estimates while the global tracker fuses target states obtained from other sensors if they improve the accuracy of the target tracks.

For the purposes of testing the feature relevance algorithm, a network of three radar sensors and a single moving target with constant velocity were considered. Two sensors were considered as good and one as bad. A sensor was defined as bad if its measurements were corrupted with high noise (for example SNR=−6 dB). In this example the SNR of a good sensor is 10 dB. The measurements from a radar at each sensor node was used to estimate the target states using the local Kalman filter algorithm. The estimated target states at each sensor node were transmitted to other nodes. For simplicity, only the estimated position was considered as the target state.

The estimated state vector is the feature set here. For simplicity, the feature relevance algorithm was implemented at sensor node 1 with the assumption that it is a good sensor. The state estimate outputs of this node are represented as $A_g$. The state estimate outputs of a second sensor are represented as $B_g$ and a the state estimate outputs of a third sensor are represented as $B_b$.

For the computation of entropy and conditional entropy, probability and conditional probability values are needed respectively, as seen from the equations in the sections above. To obtain these values, ideally, probability distribution functions (PDFs) would be used. However, in practice it is hard to obtain closed-form PDFs. In the absence of knowledge of actual PDFs, it is a common practice in the art to estimate them by using histograms. Another practical solution to estimate the probability and conditional probabilities is by using a counting or frequency approach, an example of which may be found in the well-known text "Numerical Recipes in C" by S. A. Teukolsky, W. T. Veterling, and B. P. Flannery, pp. 632-635, published by Cambridge University Press, 1992. However, it is well-known that the estimates of probabilities and conditional probabilities are more accurate if they are generated by using the PDFs that are approximated from the histograms. Therefore, for this example, the histogram approach was used. In order to obtain the histograms, initially, some information (features) were necessary regarding their distributions. For this purpose, it was assumed that initially N state estimate vectors were accumulated at each sensor node and these accumulated vectors were transmitted to other nodes. Note also that the accuracy of probability estimates using the histogram approach depends on the amount of accumulated (training) data. Also for non-stationary features, it depends on how often the histograms are updated. In practice, since the training data is limited, a set of N to 10 was used. To accomodate the non-stationarity of the features, initially, a waiting period was provided until the N estimates were obtained at each node. From then on, the histograms were updated at every time instant using the new state estimate and previous nine state estimates. At each time instant the oldest information (the oldest state estimate) was discarded.

To obtain the probability of occurrence of each feature vector, first the histogram was computed. For this, a bin size $N_{bin}$ of 5 was used. The center point of each bin was chosen based on the minimum and maximum information values. In this example, the bin centers were set as:

$$\min(\text{feature values}) + (0 : N_{bin} - 1) * \frac{\max(\text{feature values}) - \min(\text{feature values})}{N_{bin}}.$$

Figure 6B:
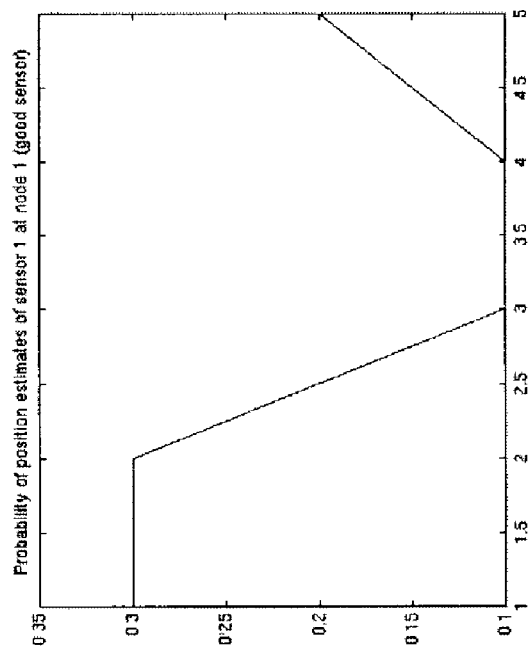
FIG. 6(b) is a graph depicting a probability distribution derived from the histogram shown in FIG. 6(a)
Figure 6A:
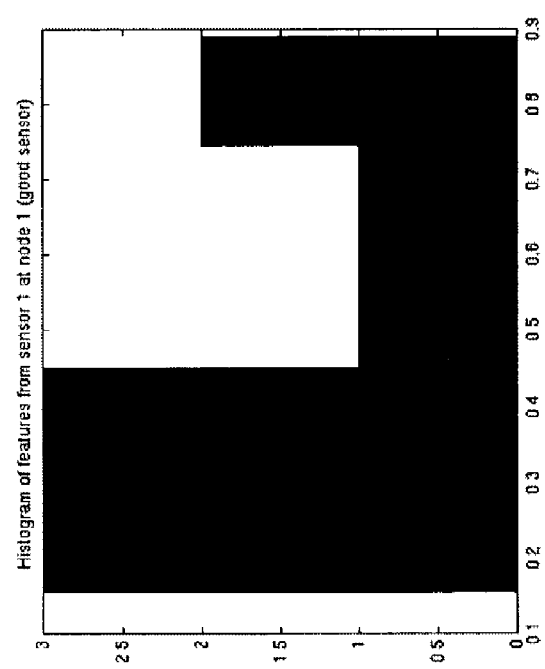
FIG. 6(a) is a histogram plot of estimated position features obtained from sensors at node 1 in an example embodiment of the present invention.
Figure 6D:
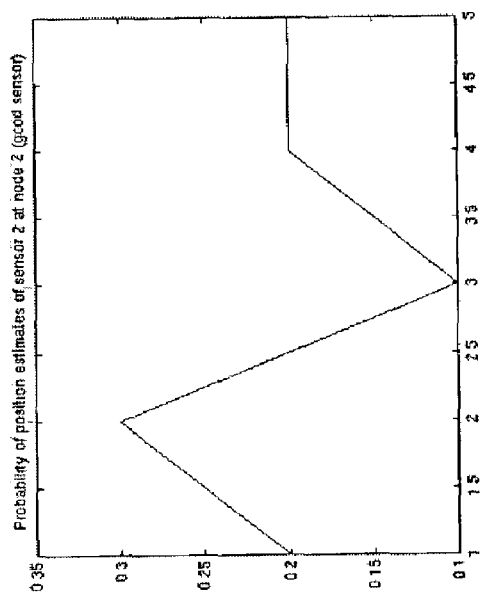
FIG. 6(d) is a graph depicting a probability distribution derived from the histogram shown in FIG. 6(c)
Figure 6C:
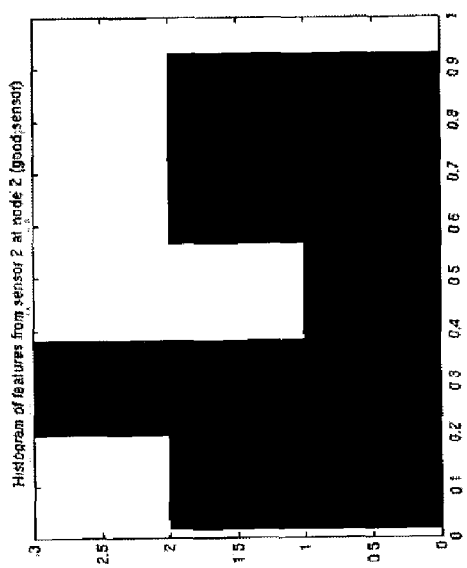
FIG. 6(c) is a histogram plot of estimated position features obtained from sensors at node 2 in an example embodiment of the present invention.
Figure 6F:
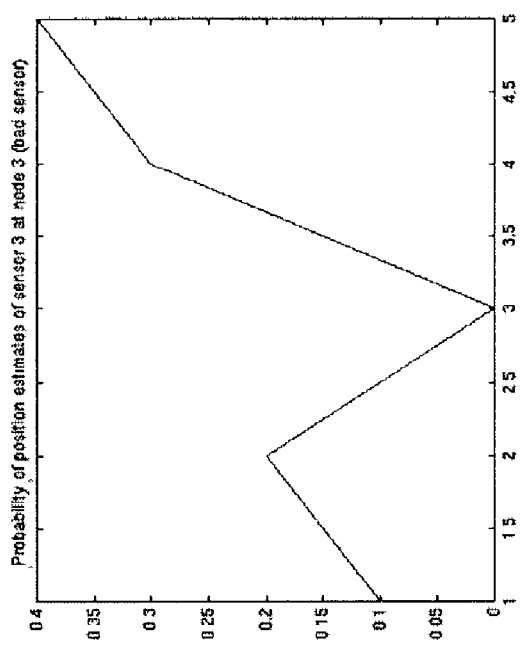
FIG. 6(f) is a graph depicting a probability distribution derived from the histogram shown in FIG. 6(e)
Figure 6E:
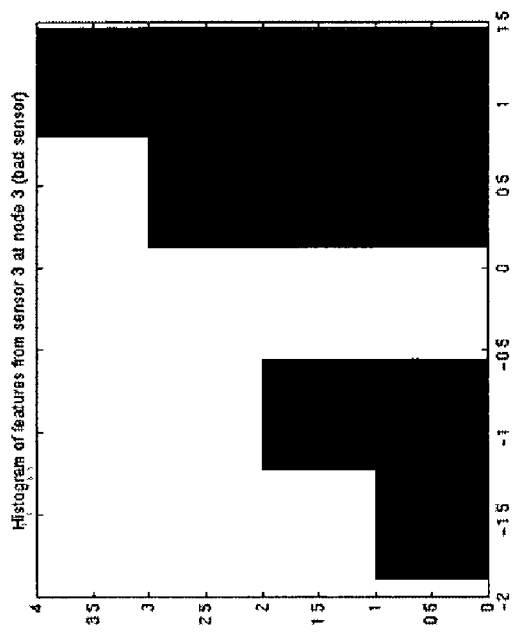
FIG. 6(e) is a histogram plot of estimated position features obtained from sensors at node 3 in an example embodiment of the present invention.

Histograms of the estimated position features obtained from sensors at node 1, node 2, and node 3 for one time instance are plotted in FIG. 6(a), FIG. 6(c), and FIG. 6(e), respectively. Since the histogram provides the number of elements in a given bin, it is possible to compute the probabilities from the histogram. In particular, the probabilities are computed as:

$$\frac{\text{\# elements in a particular bin}}{\text{total number of elements}}.$$

Figure 7B:
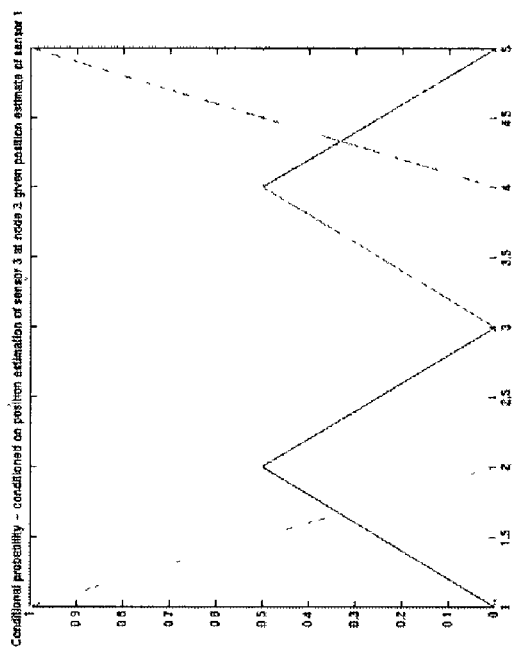
FIG. 7(b) is a plot of the conditional probability of $(A_g/B_b)$ computed from conditional histograms of FIGS. 6(a), 6(c), and 6(d)
Figure 7A:
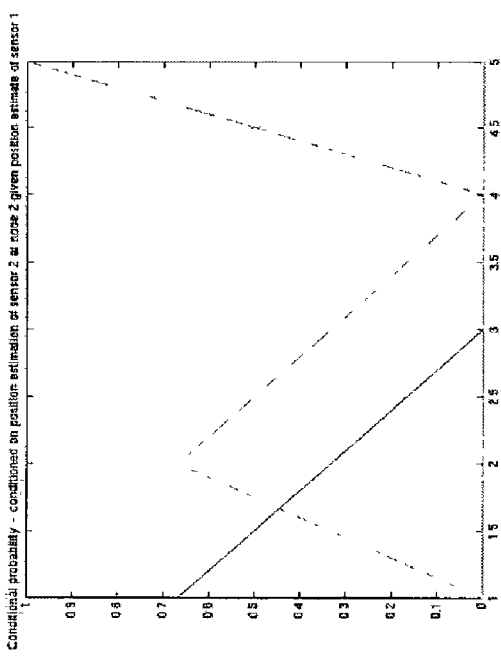
FIG. 7(a) is a plot of the conditional probability of $(A_g/B_g)$ computed from conditional histograms of FIGS. 6(a), 6(c), and 6(d)

Hence, from these histograms, probabilities were computed and the probabilities for each of these sensors are plotted in FIG. 6(b), FIG. 6(d), and FIG. 6(f), respectively. Similarly, conditional probabilities of $(A_g/B_g)$ and $(A_g/B_b)$ were computed from the conditional histograms and this conditional probabilities are plotted in FIG. 7(a) and FIG. 7(b), respectively. Each line in these two plots represents one set of conditional probability values. Note that both A and B are vectors and there would be one set of conditional probabilities for each member in set A. That is, for the member $a_k$ of A, there would be $p(a_k/b_l) l=1,2, \ldots$, conditional probability values. Since the bin size has been chosen as five, there are five members in set A and five in set B and hence, there are five subplots in FIG. 7(a) and FIG. 7(b).

Using these probabilities, conditional entropies $H(A_g/B_g)$ and $H(A_g/B_b)$, and mutual information $I(A_g, B_g)$ and $I(A_g, B_b)$ were computed using the equations mentioned above for one set of features from sensor at node 2 and node 3. $I(A_g, B_g)$ and $I(A_g, B_b)$ for this set were equal to 2.4464 and 1.8464, respectively. This indicated that $I(A_g, B_g) > I(A_g, B_b)$. This implied that the uncertainty was better resolved by observing $B_g$ as compared to $B_b$. This further implied that $B_g$ corresponds to features from a sensor that was relevant to the sensor at node 1 and thus helped in improving its decision accuracy (e.g. track accuracy) and $B_b$ corresponded to features from a sensor that were irrelevant to the sensor at node 1, and hence, $B_b$ should not have been considered. Indeed, the sensor at node 3 was irrelevant in the sense that its measurements were corrupted by high energy noise (SNR=−6 dB), and hence its state estimates were not as accurate as $B_g$. Thus, the track accuracy would have been reduced if $A_g$ had been included in the fusion. This demonstrated how the mutual information metric, when used to measure relevance, could be used in information fusion. After this initial computation of probabilities, conditional entropy, and mutual information, whenever a sensor estimates a new feature, it was replaced by the oldest feature in the feature set and was subsequently transmitted to other sensors. Subsequently, the histograms, probabilities, conditional entropy and mutual information were computed using this updated feature set. As mentioned before, this eliminated the non-stationarity of state estimates. The computed $I(A_g, B_g)$ and $I(A_g, B_b)$ pairs, after adding a newest feature by discarding the oldest feature for three different times, were: 2.1708 and 2.0463; 2.7218 and 2.1218; and 2.2464 and 2.0464, respectively. From these values it can be seen that each time, $I(A_g, B_g) > I(A_g, B_b)$. Thus each new feature can be verified to ensure its relevancy in terms of helping to improve the decision accuracy (e.g., track accuracy). In this sense, the dynamic nature of the present invention is clear.

In order to demonstrate that this information/feature relevance technique works consistently, a Montecarlo simulation was performed by executing the algorithm one hundred times. For all of the one hundred runs of simulation, $I(A_g, B_g) > I(A_g, B_b)$. This also implied that the approach of approximating the PDFs using the histograms for the computation of probabilities and conditional probabilities is not only practical but also consistent and reasonable.

To verify the versatility of this technique in terms of its applicability to different types of information, different feature sets, namely, those involving the first difference in position estimates and the actual measurements from the radar sensors, were also considered. A similar situation to that just described was performed using these feature sets and the associated histograms for the probability, entropy, and mutual information computations in both cases. In these two cases $I(A_g, B_g) > I(A_g, B_b)$ always resulted for each of the one hundred runs of Montecarlo simulations.

Figure 8:
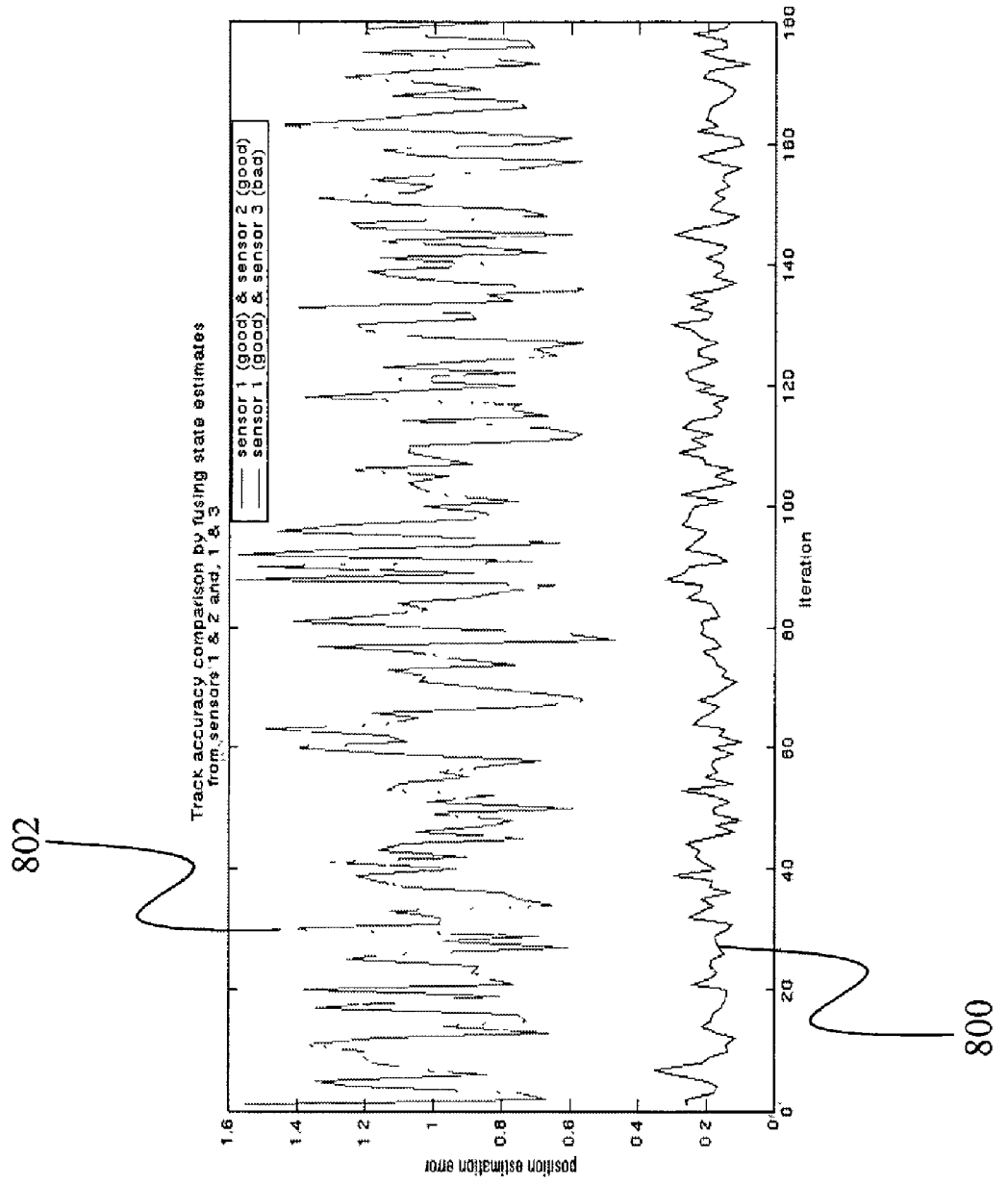
FIG. 8 is a graph plotting position estimation error using fused state estimates of sensor $A_g$ and $B_g$, and $A_g$ and $B_b$ in an example embodiment of the present invention.

To check whether the decision accuracy (e.g., track accuracy) improved when the mutual information entropy-based test is used as a measure of relevance in information fusion, the following experiment was conducted. As before the mutual information $I(A_g, B_g)$ and $I(A_g, B_b)$ was computed using measurements as a feature set. If $I(A_g, B_g) > I(A_g, B_b)$ then the state estimates from the sensor $B_g$ (sensor 2) were fused with sensor $A_g$ (sensor 1) using the global Kalman filter algorithm and the position estimation error was computed by comparing the fused state estimate with the true target position. To compare the track accuracies, the state estimates from the sensor $B_b$ (sensor 3) and the sensor $A_g$ were also fused using the global Kalman filter algorithm. The position estimation error was then computed in the same way as explained above. In FIG. 8, the position estimation error using the fused state estimates of sensor $A_g$ and sensor $B_g$ 800 and $A_g$ and $B_b$ 802 were plotted. From this figure, it can be seen that the track accuracy after fusing the state estimates from sensors $A_g$ and $B_g$ is much better than fusing the state estimates from $A_g$ and $B_b$. This implies that the mutual information metric correlates with better decision accuracy and hence, can be used in information fusion.

Next, several example applications of the present invention are provided. These examples are not intended to limit the scope of the invention, but rather to aid in an understanding of how the invention may be used in a variety of different contexts. Note that even within the examples presented, the present invention may be applied in a variety of manners, depending on the goals of a particular embodiment.

(6) Example Applications of the Present Invention

In this section a sample of potential uses for the present invention is provided. This sample is not intended to limit the invention, but rather, it is provided to give a general understanding of how the invention may be employed in a variety of circumstances so that the reader can more readily adapt the invention to the requirements of a particular problem.

a. Radar Systems for Classifying Objects such as Aircraft

Figure 9:
FIG. 9 is an illustrative diagram of an embodiment of the present invention applied for classifying objects by use of a radar sensor network.

An example context in which the present invention could be employed for classifying objects by use of a radar sensor network that employs a set of radar sensors to provide coverage over a geographic area. Such a system could be employed in many locations, such as at airports, in battle fields, at sea, or in space. Such a context is depicted in FIG. 9. In the figure, an aircraft 900 is shown flying over a varied terrain. A plurality of radar sensors 902 are provided across the terrain. The radar sensors 902 are activated based on the current level of knowledge regarding the aircraft 900, with the next radar sensor 902 to be activated being determined by the present invention in accordance with its expected ability to provide the information most useful to the classification of the aircraft 900. By optimizing the use of the radar sensors 902 for gathering useful information regarding the aircraft 900, the system can conserve energy. Additionally, because the radar sensors 902 are not continuously active, they may be hidden from the aircraft 900 until they are activated. Power conservation may be an especially important factor in the use of a plurality of small, self-powered radar sensors 902 deposited across a battlefield as an ad-hoc sensor network.

This example could also be used for identifying vehicles on a battlefield or ships at sea. Furthermore, the radar sensors 902 could be substituted with acoustic/sonar sensors for identifying underwater objects and vehicles while generating a minimal amount of underwater noise.

b. Medical Diagnosis

Figure 10:
FIG. 10 is an illustrative diagram of an embodiment of the present invention applied for medical diagnosis.
Figure 10:
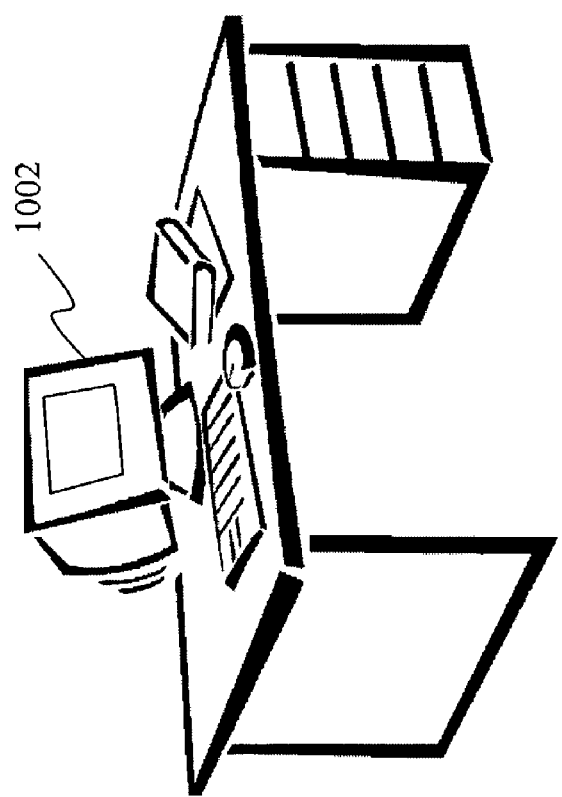

The present invention can also be used for medical diagnosis to aid physicians in identifying and treating ailments. FIG. 10 is an illustrative diagram that shows a situation in which a physician 1000 interacts with the present invention in the form of a computer 1002 along with a variety of potential medical tests 1004. In this situation, the present invention can be used to provide a current certainty level regarding a medical diagnosis. For example, the physician 1000 could initially enter the information obtained from an cursory manual inspection of a patient into the computer 1002, which embodies the techniques of the present invention. Based on the initial entry, the system can attempt to diagnose (classify) the patient's ailment and can provide a degree of certainty regarding the classification. The system can then make a recommendation regarding which available test 1004 the physician 1000 should perform in order to yield the maximum amount of information regarding the patient. As part of its recommendation, the computer 1002 would weigh the cost of the test against the value of the information likely to be received. The cost/benefit analysis could be adjusted not only on the financial cost of the test, but also on the patient's financial capability, the seriousness of the condition (e.g., whether it is life-threatening or not, etc.). The threshold that determines when the cost of a test is too high in light of the likely benefit can be adjusted based on the patient's risk tolerance and financial ability. A threshold based on cost/benefit as well as a threshold based on overall diagnosis certainty could be used so that the system knows when to cease information gathering activities. In addition to explicit recommendation to, and data entry from, a physician, the present invention may also operate as part of an automatic testing procedure, such as in the performance of blood tests.

c. Systems for Optimizing the Allocation of Wired or Wireless Network Resources

Figure 11:
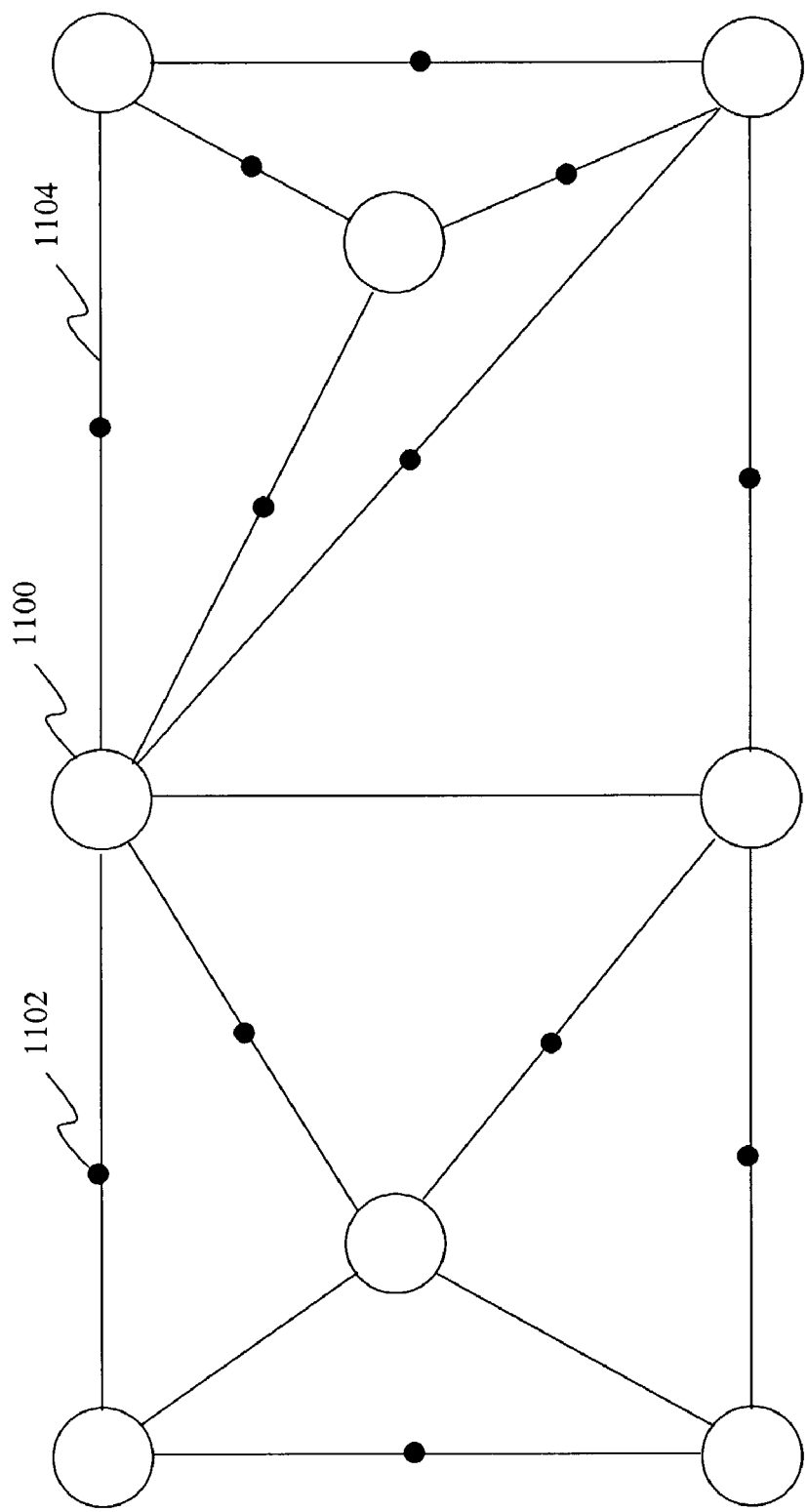
FIG. 11 is an illustrative diagram of an embodiment of the present invention applied to a computer network for optimizing network resource use.

In this scenario, the present invention could be used in a network as depicted in FIG. 11, where a group of interconnected nodes 1100 is shown. In the case shown in the diagram, a throughput sensor 1102 is placed along each transmission line 1104. As a network increases in size, the number of throughput sensors 1102 increases, and the processing of data from the throughput sensors 1102 requires an increasing amount of processing resources. Thus, it is desirable to activate only those sensors 1102 necessary to assist in routing a particular communication. Additionally, in some circumstances, only a subset of network nodes 1100 may be active or may be able to transmit data. The throughput sensors 1102 thus may also be coupled with the network nodes 1100 to determine which are active and which would need to be activated in order to transmit data. The system may have prior knowledge of the likely state of the network nodes 1100 and may query along the most likely path for a transmission based on the cost of transmitting the data in terms of resource use as well as the time required to activate inactive, but necessary, nodes 1100. If the best path is too costly to transmit over, the system can then query the path most likely to be the next best.

In another situation involving a distributed processing environment, the sensors 1102, rather than monitoring throughput, may monitor processing priority of a plurality of network nodes 1100 in order to determine the least "expensive" manner in which to process a particular job by querying the set of processors most likely to be able to accomplish the processing job with an acceptable processing cost. Processing cost here could, for example, be the opportunity cost of taking limited processing resources from other processing jobs and allocating them to a new processing job. Based on specific processor types, the present invention could be used to optimize the allocation of the processing resources of the network to maximize its processing speed over a set of processing jobs.

d. Investment and Economic Decision-Making

Figure 12:
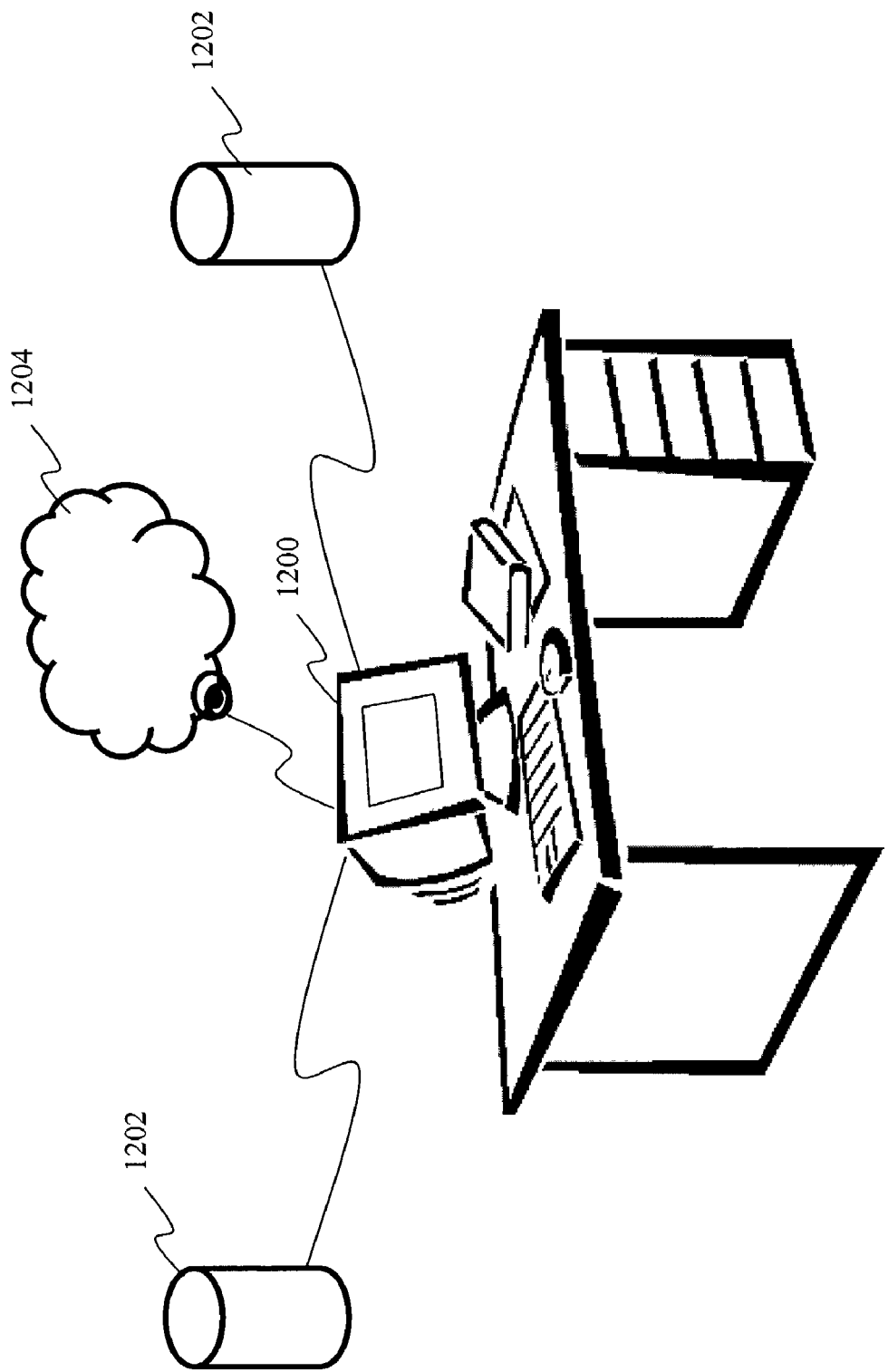
FIG. 12 is an illustrative diagram of an embodiment of the present invention applied for financial/economic planning or investment portfolio optimization.

In this scenario, the present invention may be used to gather information for investment or economic decision-making. FIG. 12 presents an illustration of an economic decision-making system in the form of a computer system 1200 attached to network resources such as a database 1202 and the Internet 1204. Other information sources could include user input such as the results of marketing surveys or other customized information. An example use of this system is in predicting future stock prices. Such business-related information could include historic stock prices, economic indicators, information from company reports, and information from the news. These information sources have varying prices and also vary in their probative value. "Price" in the sense used here includes a number of dimensions, examples of which include financial costs, intelligence-gathering-related costs, and timeliness costs. Provided with a financial model, the present invention could gather information regarding a particular stock for addition to a portfolio. As the system gathers information, it could query information sources based on their likely cost/benefit ratio in order to generate, with a desired likelihood, recommendations regarding whether the stock would enhance/optimize the value of the portfolio.

In a similar application, the invention could be applied in a marketing system in a variety of ways, such as to aid in gathering information to help in produce pricing strategies or to aid market researchers in efficiently gathering the most probative market data through recommendations regarding data gathering strategy. The information gathered could be used for price-setting, product distribution, or other marketing-related decisions.

e. Aircraft and Space Guidance Systems

Fuel use in aircraft or space vehicles may be also be optimized through use of the present invention. For example, a space craft may include several separately fueled and operated thrusters. Based on predicted thrust needs, the present invention could aid in such a scenario by helping to choose a combination of thrusters to use for a particular maneuver based on the value of each thruster in an overall mission plan. Although one thruster may be able to provide the necessary power for a particular maneuver, the particular thruster may be very valuable for another planned maneuver. By weighing the cost of using a particular thruster with its value for a particular maneuver versus the value of conserving it for another use later, the present invention can aid in ensuring that fuel in a particular thruster is reserved for its optimal use. Although an overall mission plan may include a schedule of thruster use, the present invention can aid in minimizing the impact of unforeseen deviations from the mission plan on the craft's ability to complete its mission effectively.

f. Battlefield Assessment and Resource Allocation Systems

Figure 13:
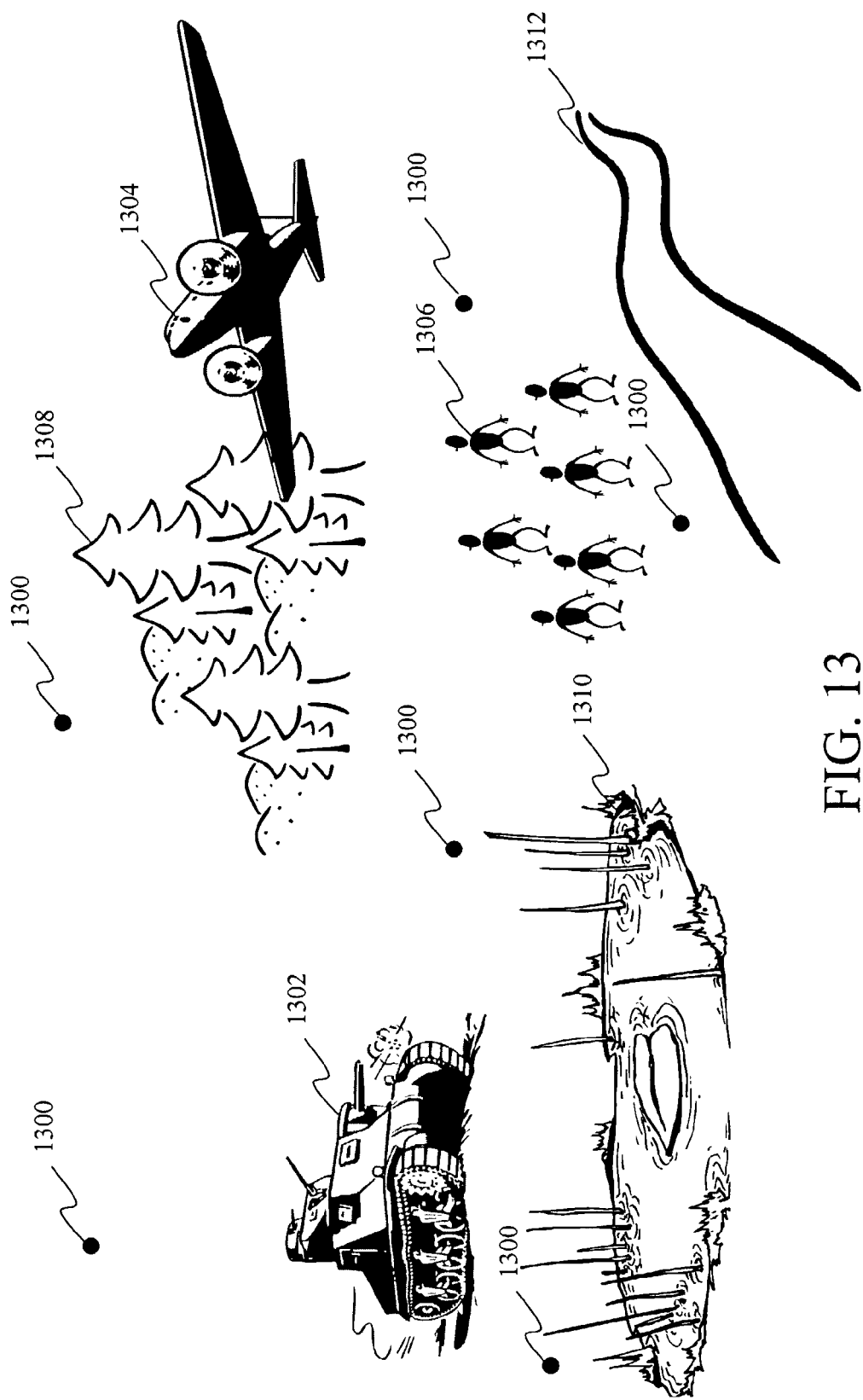
FIG. 13 is an illustrative diagram of an embodiment of the present invention applied in a battlefield setting for optimum military resource allocation.

Another example scenario in which the present invention could have utility is in battlefield assessment and resource allocation systems. A simple illustrative diagram of a battlefield scenario is depicted in FIG. 13, with a plurality of sensor nodes 1300 distributed throughout a geographical area. In this situation, the sensor nodes 1300 may be distributed in an ad-hoc manner in order to detect terrain features as well as objects in the battlefield. A few objects are shown, including both enemy resources such as a tank 1302, an aircraft 1304, and personnel 1306. Geographic features are also shown, including a forest 1308, a lake 1310, and a river 1312. Because the sensor nodes 1300 in this scenario are likely to be self-powered, it is desirable to conserve power. Furthermore, by minimizing transmissions, the likelihood of the nodes' 1300 detection is also minimized. In addition, depending on the method by which the nodes 1300 are delivered to their field positions, they may have sustained damage in the process.

In this scenario, the present invention may be used in several manners. It may be used to determine a particular sensor on board a particular node to activate in order to search for a particular type of object. It could also be used for finding likely paths by which military resources (e.g. men, machines, and supplies) may be transported safely across the battlefield while weighing costs along a route (in terms of the chance of loss, energy expended, time of transport, etc.). Additionally, it could be used for determining which resources to allocate for a particular task (e.g. which resources to allocate to combat a particular enemy resource).

Using the same principles, the present invention could also be used for optimally allocating resources in on a construction site, in forest fire fighting, or in other non-military applications. Note that these applications are conceptually similar to applications for monitoring and allocating resources in a computer network.

g. Manufacturing Process Diagnosis

Application of the present invention to manufacturing processes is similar to that of allocating resources in the computer network and military situations previously discussed. The information sources (sources of manufacturing activities—with information gathered through user input or through sensors), in this case, could be, for example, sensors that detect manufacturing bottlenecks and latencies. Based on their cost (e.g. wages of employees, risk of creating another bottleneck, etc.) versus the likely benefit of their re-allocation, manufacturing resources can be continually monitored and re-deployed in order to maximize the efficiency of a manufacturing process. The same principle may be applied regardless of the resource to be monitored and re-allocated, whether it is an energy resource, a human resource, a raw material resource, or another type of resource. This process may also be extended to aid in resource allocation for "Just-In-Time" manufacturing systems to ensure high output efficiency.

h. Computer Technical Support and Automated Computer "Maintenance Wizards"

The present invention can also be used in computer maintenance and technical support, both automated and human-operated. For example, in a computer support organization, a telephone operator could enter information regarding what the user has done to the present for solving a particular problem, and could enter other information regarding the user's system. The present invention, with the scenario information thus inputted, could assist in determining the next action for the user to perform in order to achieve a desired result. For example, given a wide variety of possible tests that a user could perform for solving a particular difficulty with their computer system, the present invention could aid in determining the next step that would most likely contribute to the solution of the problem. This is similar to the case of medical diagnosis. A similar embodiment of the present invention could be used in automated computer maintenance wizards that maintain a database regarding a variety of problems on a computer. The wizard, based on user input could, assist in determining the most likely solution that has the lowest cost (e.g. helping the user to determine files to remove to cure a particular problem before resorting to reformatting the computer's hard drive).

i. Mobile Node Collaborator Information Gathering Systems

In the scenario discussed above regarding military resource allocation, the nodes may be mobile. Given some prior knowledge regarding the battlefield, and a query for further information, the nodes could move in order to collect data. In this scenario, the cost of moving the node (e.g. loss of monitoring the current location of a node, potential loss of the node due to hazards, potential cost of detection of the node by enemy forces, cost of power consumption, etc.), could be weighed with the importance and likely probative value of the information that the node would gather if it is moved. The mobile nodes could, for example, be satellites, terrestrial-based nodes, air-based nodes, or aquatic nodes.

j Counter-Terrorism Information Gathering and Decision-Making

Use of the present invention could include counter-terrorism operations. A wide variety of scenarios may be envisioned for this application. In an application similar to that discussed for investment and economic analysis, the present invention could track potential terrorists by gathering data from a variety of sources, including physical investigation by law enforcement. In this case, as with investment analysis, the information gathering process has costs, examples of which include financial costs, opportunity costs due to re-allocation of resources, costs associated with physical risks to law enforcement officers, etc. which must be weighed against the probative value of the information. Such a system could aid in resource management and could provide a degree of automation to the process of terrorist tracking.

As demonstrated by the examples in this section, the present invention may be applied in a wide variety of scenarios and for a wide variety of goals. Many other applications and situations will be readily apparent to one of skill in the art, and are considered within the scope of this invention.

What is claimed is:

1. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive; and determining a classification based on the partial set of information;

wherein the information sources include a plurality of information sources selected from a group consisting of databases, sensors, and user inputs;

wherein the sensors include sensors selected from a group consisting of seismic sensors, temperature sensors, acoustic sensors, infrared sensors, and radar sensors: and wherein the sensors are radar sensors, wherein the information gathered is information regarding at least one object, and wherein the method further comprises a step of using the information gathered to determine an object classification for each object about which information was gathered.

2. A method for determining and assessing information to be collected from a set of information sources for a desired level of decision accuracy as set forth in claim 1, wherein the objects to be classified are aircraft.

3. A method for determining and assessing information to be collected from a set of information sources for a desired level of decision accuracy, as set forth in claim 2, wherein the sensors are clustered into nodes.

4. A method for determining and assessing information to be collected from a set of information sources for a desired level of decision accuracy the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive; and determining a classification based on the partial set of information;

wherein the information sources include a plurality of information sources selected from a group consisting of databases, sensors, and user inputs; and wherein the sensors provide information regarding routing of network communications in a computer network, and wherein the method further comprises a step of using the information gathered to determine optimal paths for routing signals within the computer network.

5. A method for determining and assessing information to be collected from a set of information sources for a desired level of decision accuracy, as set forth in claim 4, wherein the computer network comprises a plurality of computers connected by wireless links, and wherein the sensors provide information regarding routing wireless network communications in the computer network.

6. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources: and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources: and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive; and determining a classification based on the partial set of information;

wherein the information sources include a plurality of information sources selected from a group consisting of databases, sensors, and user inputs; and wherein the information sources provide information for optimizing an investment portfolio, and wherein the method further comprises a step of using the information gathered to provide a recommendation regarding an investment to be made.

7. A method for determining and assessing information to be collected from a set of information sources for a desired level of decision accuracy as set forth in claim 6, wherein the information sources include databases of business-related information.

8. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive: and determining a classification based on the partial set of information;

wherein the information sources include a plurality of information sources selected from a group consisting of databases, sensors, and user inputs; and wherein the sensors provide information regarding processing capabilities of a plurality of data processors in a distributed computing environment and about current processing jobs within the plurality of data processors, and wherein the method further comprises a step of using the information gathered to determine the processors to use for optimal processing of a new processing job.

9. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source: and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive; and determining a classification based on the partial set of information;

wherein the information sources include a plurality of information sources selected from a group consisting of databases, sensors, and user inputs; and wherein the information sources are selected from a group consisting of databases of marketing information and market studies to be performed by a user, and wherein the method further comprises a step of using the information gathered to make marketing-related recommendations.

10. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources: and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive; and determining a classification based on the partial set of information;

wherein the information sources include a plurality of information sources selected from a group consisting of databases, sensors, and user inputs; and wherein the information sources are medical information sources, and wherein the method further comprises a step of using the medical information gathered to diagnose a medical patient or to recommend a treatment for a medical patient.

11. A method for determining and assessing information to be collected from a set of information sources for a desired level of decision accuracy as set forth in claim 10, wherein the cost/benefit analysis is adjusted based on a factor selected from a group consisting of a patient's desires and the seriousness of a possible medical condition.

12. A method for determining and assessing information to be collected from a set of information sources for a desired level of decision accuracy as set forth in claim 10, wherein the user input is the results of specific medical tests performed.

13. A method for determining and assessing information to be collected from a set of information sources for a desired level of decision accuracy as set forth in claim 10, wherein the information gathered from sensors includes the results of automated medical tests.

14. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources: and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive; and determining a classification based on the partial set of information;

wherein the information sources include a plurality of information sources selected from a group consisting of databases, sensors, and user inputs: and wherein the sensors monitor manufacturing activities, and wherein the method further comprises a step of using the information gathered to allocate resources in a manufacturing process in order to optimize the use of resources in the manufacturing process.

15. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive: and determining a classification based on the partial set of information;

wherein the information sources include a plurality of information sources selected from a group consisting of databases, sensors, and user inputs: and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the steD of performing the minimax entropy-based test on the auamented partial set of information, whereby the partial set of information is iteratively augmented with additional information until there is no further information to add or until adding further information would be cost-prohibitive: and determining a classification based on the partial set of information;

wherein the information sources include a plurality of information sources selected from a group consisting of databases, sensors, and user inputs; and wherein the information sources are terrorist-related data sources, and wherein the method further comprises a step of using the information gathered to track potential terrorists.

16. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and wherein the sensors provide feedback from individual ones of a plurality of engines on a vehicle, and wherein the method further comprises a step of determining which engine or combination of engines to use for a particular maneuver of the vehicle.

17. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive: and determining a classification based on the partial set of information;

wherein the information sources include a plurality of information sources selected from a group consisting of databases, sensors, and user inputs; and wherein the information sources provide information regarding resource allocation on a battlefield, and wherein the method further comprises a step of using the information gathered to make recommendations regarding future resource allocation on the battlefield in order to optimize the use of resources on the battlefield.

18. A method for determining and assessing information to be collected from a set of information sources for a desired level of decision accuracy, the method comprising steps of:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources; and when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive; and determining a classification based on the partial set of information;

wherein the information sources include a plurality of information sources selected from a aroup consisting of databases, sensors, and user inputs; and where the user input is information to aid in solving a computer problem, and wherein the method further comprises a step of using the information gathered to make recommendations regarding the most likely way to correct the problem.

19. A computer program product for determining and assessing information to be collected from a set of information sources for a desired level of decision accuracy the computer program product comprising means, stored on a computer readable medium, for:

receiving a partial set of information from at least a subset of the information sources for a decision to be made;

performing a minimax entropy-based test to determine an information source from which to next gather information that is most likely to improve the decision accuracy;

performing a mutual information entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources;

when the consistency check succeeds, gathering the information from the information source and adding the information to the partial set of information to produce an augmented partial set of information, and starting again with the means for performing the minimax entropy-based test on the augmented partial set of information, whereby the partial set of information is iteratively augmented with additional information until there is no further information to add or until adding further information would be cost-prohibitive; and determining a classification based on the partial set of information.

20. A computer program product for determining and assessing information to be collected from a set of information sources for a desired level of decision accuracy, as set forth in claim 19, wherein the means of the computer program product are configured to receive information from a plurality of information sources selected from a group consisting of databases, sensors, and user inputs.

21. A computer program product for determining and assessing information to be collected from a set of information sources for a desired level of decision accuracy, as set forth in claim 20, wherein the information sources from which information may be gathered include a plurality of sensors with the sensors clustered into nodes.

22. A computer program product for determining and assessing information to be collected from a set of information sources for a desired level of decision accuracy, as set forth in claim 21, wherein the nodes are dormant, and wherein the means for gathering the information is configured to activate only the nodes from which information is to be gathered.

23. A computer program product for determining and assessing information to be collected from a set of information sources for a desired level of decision accuracy, as set forth in claim 22, wherein the nodes are mobile, and wherein the means for gathering the information is configured to assist in directing the nodes to a location from which the information is to be gathered.

24. A computer program product for determining and assessing information to be collected from a set of information sources for a desired level of decision accuracy, as set forth in claim 23, wherein the cost/benefit analysis is based a factor including the cost of moving the node from a present position versus the benefit of moving the node to a new location.

25. A computer program product for determining and assessing information to be collected from a set of information sources for a desired level of decision accuracy, as set forth in claim 24, wherein means of the computer program product are configured to operate with nodes that are objects selected from a group consisting of satellite nodes, terrestrial nodes, air-based nodes, and aquatic based nodes.

26. A computer program product for determining and assessing information to be collected from a set of information sources for a desired level of decision accuracy, as set forth in claim 20, wherein the means of the computer program product are configured for receiving information from sensors selected from a group consisting of seismic sensors, temperature sensors, acoustic sensors, infrared sensors, and radar sensors.

27. A computer program product for determining and assessing information to be collected from a set of information sources for a desired level of decision accuracy, as set forth in claim 26, wherein the means of the computer program product are configured to receive information from radar sensors, wherein the information gathered is information regarding at least one object, and wherein the computer program product further comprises a means for using the information gathered to determine an object classification for each object about which information was gathered.

28. A computer program product for determining and assessing information to be collected from a set of information sources for a desired level of decision accuracy as set forth in claim 27, wherein the objects to be classified are aircraft.

29. A computer program product for determining and assessing information to be collected from a set of information sources for a desired level of decision accuracy as set forth in claim 28, wherein the wherein the nodes are dormant, and wherein the means for gathering the information activates only the nodes from which information is to be gathered.

30. A computer program product for determining and assessing information to be collected from a set of information sources for a desired level of decision accuracy, as set forth in claim 20, wherein the means of the computer program product are configured to receive information from sensors that provide information regarding routing of network communications in a computer network, and wherein the computer program product further comprises a means for using the information gathered to determine optimal paths for routing signals within the computer network.

31. A computer program product for determining and assessing information to be collected from a set of information sources for a desired level of decision accuracy as set forth in claim 30, wherein the means of the computer program product are configured to receive information from sensors on a computer network that comprises a plurality of computers connected by wireless links, and wherein the sensors provide information regarding routing wireless network communications in the computer network.

32. A computer program product for determining and assessing information to be collected from a set of information sources for a desired level of decision accuracy, as set forth in claim 20, wherein the means of the computer program product are configured to receive information from information sources that provide information for optimizing an investment portfolio, and wherein the computer program product further comprises a means for using the information gathered to provide a recommendation regarding an investment to be made.

33. A computer program product for determining and assessing information to be collected from a set of information sources for a desired level of decision accuracy as set forth in claim 32, wherein the means of the computer program product are configured to receive information from databases of business-related information.

34. A computer program product for determining and assessing information to be collected from a set of information sources for a desired level of decision accuracy as set forth in claim 20, wherein the means of the computer program product are configured to receive information from sensors that provide information regarding processing capabilities of a plurality of data processors in a distributed computing environment and about current processing jobs within the plurality of data processors, and wherein the computer program product further comprises a means for using the information gathered to determine the processors to use for optimal processing of a new processing job.

35. A computer program product for determining and assessing information to be collected from a set of information sources for a desired level of decision accuracy as set forth in claim 20, wherein the means of the computer program product are configured to receive information from information sources selected from a group consisting of databases of marketing information and market studies to be performed by a user, and wherein the computer program product further comprises a means for using the information gathered to make marketing-related recommendations.

36. A computer program product for determining and assessing information to be collected from a set of information sources for a desired level of decision accuracy as set forth in claim 20, wherein the means of the computer program product are configured to receive information from medical information sources, and wherein the computer program product further comprises a means for using the medical information gathered to diagnose a medical patient or to recommend a treatment for a medical patient.

37. A computer program product for determining and assessing information to be collected from a set of information sources for a desired level of decision accuracy as set forth in claim 36, wherein the means for performing a cost/benefit analysis is adjusted based on a factor selected from a group consisting of a patient's desires and the seriousness of a possible medical condition.

38. A computer program product for determining and assessing information to be collected from a set of information sources for a desired level of decision accuracy as set forth in claim 36, wherein the means of the computer program product are configured to receive information in the form of user input of the results of specific medical tests performed.

39. A computer program product for determining and assessing information to be collected from a set of information sources for a desired level of decision accuracy as set forth in claim 36, wherein the means of the computer program product are configured to receive information gathered from the results of automated medical tests.

40. A computer program product for determining and assessing information to be collected from a set of information sources for a desired level of decision accuracy as set forth in claim 20, wherein the means of the computer program product are configured to receive information from sensors that monitor manufacturing activities, and wherein the computer program product further comprises a means for using the information gathered to allocate resources in a manufacturing process in order to optimize the use of resources in the manufacturing process.

41. A computer program product for determining and assessing information to be collected from a set of information sources for a desired level of decision accuracy as set forth in claim 20, wherein the means of the computer program product are configured to receive information from terrorist-related data sources, and wherein the computer program product further comprises a means for using the information gathered to track potential terrorists.

42. A computer program product for determining and assessing information to be collected from a set of information sources for a desired level of decision accuracy as set forth in claim 20, wherein the means of the computer program product are configured to receive information in the form of feedback from individual ones of a plurality of engines on a vehicle, and wherein the computer program product further comprises a means for determining which engine or combination of engines to use for a particular maneuver of the vehicle.

43. A computer program product for determining and assessing information to be collected from a set of information sources for a desired level of decision accuracy as set forth in claim 20, wherein the means of the computer program product are configured to receive information regarding resource allocation on a battlefield, and wherein the computer program product further comprises a means for using the information gathered to make recommendations regarding future resource allocation on the battlefield in order to optimize the use of resources on the battlefield.

44. A computer program product for determining and assessing information to be collected from a set of information sources for a desired level of decision accuracy as set forth in claim 20, where the means of the computer program product are configured to receive information in the form of user input information to aid in solving a computer problem, and wherein the computer program product further comprises a means for using the information gathered to make recommendations regarding the most likely way to correct the problem.

45. An apparatus for determining and assessing information to be collected from a set of information sources for a desired level of decision accuracy, the apparatus comprising a computer system including a processor, a memory coupled with the processor, an input coupled with the processor for receiving the information from the information sources, and an output coupled with the processor for outputting an output selected from a group consisting of a recommendation, a decision, and a classification based on the information collected, wherein the computer system further comprises means, residing in its processor and memory, for:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources;

when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive; and determining a classification based on the partial set of information.

46. An apparatus for determining and assessing information to be collected from a set of information sources for a desired level of decision accuracy, as set forth in claim 45, wherein the information sources include a plurality of information sources selected from a group consisting of databases, sensors, and user inputs.

47. An apparatus for determining and assessing information to be collected from a set of information sources for a desired level of decision accuracy, as set forth in claim 46, wherein the information sources include a plurality of sensors, and wherein the sensors are clustered into nodes.

48. An apparatus for determining and assessing information to be collected from a set of information sources for a desired level of decision accuracy, as set forth in claim 47, wherein the nodes are dormant, and wherein the means for gathering the information activates only the nodes from which information is to be gathered.

49. An apparatus for determining and assessing information to be collected from a set of information sources for a desired level of decision accuracy, as set forth in claim 48, wherein the nodes are mobile, and wherein in the means for gathering the information, the nodes may move to a location from which the information is to be gathered.

50. An apparatus for determining and assessing information to be collected from a set of information sources for a desired level of decision accuracy, as set forth in claim 49, wherein the cost/benefit analysis is based a factor including the cost of moving the node from a present position versus the benefit of moving the node to a new location.

51. An apparatus for determining and assessing information to be collected from a set of information sources for a desired level of decision accuracy, as set forth in claim 48, wherein the nodes are objects selected from a group consisting of satellite nodes, terrestrial nodes, air-based nodes, and aquatic based nodes.

52. An apparatus for determining and assessing information to be collected from a set of information sources for a desired level of decision accuracy, as set forth in claim 46, wherein the sensors include sensors selected from a group consisting of seismic sensors, temperature sensors, acoustic sensors, infrared sensors, and radar sensors.

53. An apparatus for determining and assessing information to be collected from a set of information sources for a desired level of decision accuracy, as set forth in claim 52, wherein the sensors are radar sensors, wherein the information gathered is information regarding at least one object, and wherein the apparatus further comprises a means for using the information gathered to determine an object classification for each object about which information was gathered.

54. An apparatus for determining and assessing information to be collected from a set of information sources for a desired level of decision accuracy as set forth in claim 53, wherein the objects to be classified are aircraft.

55. An apparatus for determining and assessing information to be collected from a set of information sources for a desired level of decision accuracy as set forth in claim 54, wherein the wherein the nodes are dormant, and wherein the means for gathering the information activates only the nodes from which information is to be gathered.

56. An apparatus for determining and assessing information to be collected from a set of information sources for a desired level of decision accuracy, as set forth in claim 46, wherein the sensors provide information regarding routing of network communications in a computer network, and wherein the apparatus further comprises a means for using the information gathered to determine optimal paths for routing signals within the computer network.

57. An apparatus for determining and assessing information to be collected from a set of information sources for a desired level of decision accuracy as set forth in claim 56, wherein the computer network comprises a plurality of computers connected by wireless links, and wherein the sensors provide information regarding routing wireless network communications in the computer network.

58. An apparatus for determining and assessing information to be collected from a set of information sources for a desired level of decision accuracy, as set forth in claim 46, wherein the information sources provide information for optimizing an investment portfolio, and wherein the apparatus further comprises a means for using the information gathered to provide a recommendation regarding an investment to be made.

59. An apparatus for determining and assessing information to be collected from a set of information sources for a desired level of decision accuracy as set forth in claim 58, wherein the information sources include databases of business-related information.

60. An apparatus for determining and assessing information to be collected from a set of information sources for a desired level of decision accuracy as set forth in claim 46, wherein the sensors provide information regarding processing capabilities of a plurality of data processors in a distributed computing environment and about current processing jobs within the plurality of data processors, and wherein the apparatus further comprises a means for using the information gathered to determine the processors to use for optimal processing of a new processing job.

61. An apparatus for determining and assessing information to be collected from a set of information sources for a desired level of decision accuracy as set forth in claim 46, wherein the information sources are selected from a group consisting of databases of marketing information and market studies to be performed by a user, and wherein the apparatus further comprises a means for using the information gathered to make marketing-related recommendations.

62. An apparatus for determining and assessing information to be collected from a set of information sources for a desired level of decision accuracy as set forth in claim 46, wherein the information sources are medical information sources, and wherein the apparatus further comprises a means for using the medical information gathered to diagnose a medical patient or to recommend a treatment for a medical patient.

63. An apparatus for determining and assessing information to be collected from a set of information sources for a desired level of decision accuracy as set forth in claim 62, wherein the cost/benefit analysis is adjusted based on a factor selected from a group consisting of a patient's desires and the seriousness of a possible medical condition.

64. An apparatus for determining and assessing information to be collected from a set of information sources for a desired level of decision accuracy as set forth in claim 62, wherein the user input is the results of specific medical tests performed.

65. An apparatus for determining and assessing information to be collected from a set of information sources for a desired level of decision accuracy as set forth in claim 62, wherein the information gathered from sensors includes the results of automated medical tests.

66. An apparatus for determining and assessing information to be collected from a set of information sources for a desired level of decision accuracy as set forth in claim 46, wherein the sensors monitor manufacturing activities, and wherein the apparatus further comprises a means for using the information gathered to allocate resources in a manufacturing process in order to optimize the use of resources in the manufacturing process.

67. An apparatus for determining and assessing information to be collected from a set of information sources for a desired level of decision accuracy as set forth in claim 46, wherein the information sources are terrorist-related data sources, and wherein the apparatus further comprises a means for using the information gathered to track potential terrorists.

68. An apparatus for determining and assessing information to be collected from a set of information sources for a desired level of decision accuracy as set forth in claim 46, wherein the sensors provide feedback from individual ones of a plurality of engines on a vehicle, and wherein the apparatus further comprises a means for determining which engine or combination of engines to use for a particular maneuver of the vehicle.

69. An apparatus for determining and assessing information to be collected from a set of information sources for a desired level of decision accuracy as set forth in claim 46, wherein the information sources provide information regarding resource allocation on a battlefield, and wherein the apparatus further comprises a means for using the information gathered to make recommendations regarding future resource allocation on the battlefield in order to optimize the use of resources on the battlefield.

70. An apparatus for determining and assessing information to be collected from a set of information sources for a desired level of decision accuracy as set forth in claim 46, where the user input is information to aid in solving a computer problem, and wherein the apparatus further comprises a means for using the information gathered to make recommendations regarding the most likely way to correct the problem.

71. An apparatus for determining and assessing information to be collected from a set of information sources for a desired level of decision accuracy, the apparatus comprising a plurality information sources and a computer system including a processor, a memory coupled with the processor, an input communicatively coupled with the information source and with the processor for receiving information from the information sources, and an output coupled with the processor for outputting an output selected from a group consisting of a recommendation, a decision, and a classification based on the information collected, wherein the computer system further comprises means, residing in its processor and memory, for:

receiving a partial set of information from at least a subset of the information sources for a decision to be made;

performing a minimax entropy-based test to determine an information source from which to next gather information that is most likely to improve the decision accuracy;

performing a check based on a test selected from a group consisting of a mutual information entropy-based test and a conditional entropy-based test to determine whether the minimax entropy-based test generated a valid or an invalid result; and when the minimax entropy-based test is determined to have generated an invalid result, excluding the information source from the set of information sources to produce a set of remaining information sources, and repeating the minimax entropy-based test on the remaining information sources; and when the minimax entropy-based test is determined to have generated a valid result, performing a cost/benefit analysis to determine whether the information should be gathered from the information source; and when the cost/benefit analysis fails, excluding the information source from further consideration and repeating the minimax entropy-based test on the remaining information sources; and when the cost/benefit analysis succeeds, gathering the information from the information source; and performing a consistency check to determine the validity of the information gathered from the information source; and when the consistency check fails, excluding the information source from further consideration and repeating the minimax entropy-based test on the remaining information sources;

when the consistency check succeeds, gathering the information from the information source and adding the information to the partial set of information to produce an augmented partial set of information, and starting again with the step of performing the minimax entropy-based test on the augmented partial set of information, whereby the partial set of information is iteratively augmented with additional information until there is no further information to add or until adding further information would be cost-prohibitive; and determining a classification based on the partial set of information.

72. An apparatus for determining and assessing information to be collected from a set of information sources for a desired level of decision accuracy, as set forth in claim 71, wherein the information sources include a plurality of information sources selected from a group consisting of databases, sensors, and user inputs.

73. An apparatus for determining and assessing information to be collected from a set of information sources for a desired level of decision accuracy, as set forth in claim 72, wherein the information sources include a plurality of sensors, and wherein the sensors are clustered into nodes.

74. An apparatus for determining and assessing information to be collected from a set of information sources for a desired level of decision accuracy, as set forth in claim 73, wherein the nodes are dormant, and wherein the means for gathering the information activates only the nodes from which information is to be gathered.

75. An apparatus for determining and assessing information to be collected from a set of information sources for a desired level of decision accuracy, as set forth in claim 74, wherein the nodes are mobile, and wherein in the means for gathering the information, the nodes may move to a location from which the information is to be gathered.

76. An apparatus for determining and assessing information to be collected from a set of information sources for a desired level of decision accuracy, as set forth in claim 75, wherein the cost/benefit analysis is based a factor including the cost of moving the node from a present position versus the benefit of moving the node to a new location.

77. An apparatus for determining and assessing information to be collected from a set of information sources for a desired level of decision accuracy, as set forth in claim 76, wherein the nodes are objects selected from a group consisting of satellite nodes, terrestrial nodes, air-based nodes, and aquatic based nodes.

78. An apparatus for determining and assessing information to be collected from a set of information sources for a desired level of decision accuracy, as set forth in claim 72, wherein the sensors include sensors selected from a group consisting of seismic sensors, temperature sensors, acoustic sensors, infrared sensors, and radar sensors.

79. An apparatus for determining and assessing information to be collected from a set of information sources for a desired level of decision accuracy, as set forth in claim 78, wherein the sensors are radar sensors, wherein the information gathered is information regarding at least one object, and wherein the apparatus further comprises a means for using the information gathered to determine an object classification for each object about which information was gathered.

80. An apparatus for determining and assessing information to be collected from a set of information sources for a desired level of decision accuracy as set forth in claim 79, wherein the objects to be classified are aircraft.

81. An apparatus for determining and assessing information to be collected from a set of information sources for a desired level of decision accuracy as set forth in claim 80, wherein the wherein the nodes are dormant, and wherein the means for gathering the information activates only the nodes from which information is to be gathered.

82. An apparatus for determining and assessing information to be collected from a set of information sources for a desired level of decision accuracy, as set forth in claim 72, wherein the sensors provide information regarding routing of network communications in a computer network, and wherein the apparatus further comprises a means for using the information gathered to determine optimal paths for routing signals within the computer network.

83. An apparatus for determining and assessing information to be collected from a set of information sources for a desired level of decision accuracy as set forth in claim 82, wherein the computer network comprises a plurality of computers connected by wireless links, and wherein the sensors provide information regarding routing wireless network communications in the computer network.

84. An apparatus for determining and assessing information to be collected from a set of information sources for a desired level of decision accuracy, as set forth in claim 72, wherein the information sources provide information for optimizing an investment portfolio, and wherein the apparatus further comprises a means for using the information gathered to provide a recommendation regarding an investment to be made.

85. An apparatus for determining and assessing information to be collected from a set of information sources for a desired level of decision accuracy as set forth in claim 84, wherein the information sources include databases of business-related information.

86. An apparatus for determining and assessing information to be collected from a set of information sources for a desired level of decision accuracy as set forth in claim 72, wherein the sensors provide information regarding processing capabilities of a plurality of data processors in a distributed computing environment and about current processing jobs within the plurality of data processors, and wherein the apparatus further comprises a means for using the information gathered to determine the processors to use for optimal processing of a new processing job.

87. An apparatus for determining and assessing information to be collected from a set of information sources for a desired level of decision accuracy as set forth in claim 72, wherein the information sources are selected from a group consisting of databases of marketing information and market studies to be performed by a user, and wherein the apparatus further comprises a means for using the information gathered to make marketing-related recommendations.

88. An apparatus for determining and assessing information to be collected from a set of information sources for a desired level of decision accuracy as set forth in claim 72, wherein the information sources are medical information sources, and wherein the apparatus further comprises a means for using the medical information gathered to diagnose a medical patient or to recommend a treatment for a medical patient.

89. An apparatus for determining and assessing information to be collected from a set of information sources for a desired level of decision accuracy as set forth in claim 88, wherein the cost/benefit analysis is adjusted based on a factor selected from a group consisting of a patient's desires and the seriousness of a possible medical condition.

90. An apparatus for determining and assessing information to be collected from a set of information sources for a desired level of decision accuracy as set forth in claim 88, wherein the user input is the results of specific medical tests performed.

91. An apparatus for determining and assessing information to be collected from a set of information sources for a desired level of decision accuracy as set forth in claim 88, wherein the information gathered from sensors includes the results of automated medical tests.

92. An apparatus for determining and assessing information to be collected from a set of information sources for a desired level of decision accuracy as set forth in claim 72, wherein the sensors monitor manufacturing activities, and wherein the apparatus further comprises a means for using the information gathered to allocate resources in a manufacturing process in order to optimize the use of resources in the manufacturing process.

93. An apparatus for determining and assessing information to be collected from a set of information sources for a desired level of decision accuracy as set forth in claim 72, wherein the information sources are terrorist-related data sources, and wherein the apparatus further comprises a means for using the information gathered to track potential terrorists.

94. An apparatus for determining and assessing information to be collected from a set of information sources for a desired level of decision accuracy as set forth in claim 72, wherein the sensors provide feedback from individual ones of a plurality of engines on a vehicle, and wherein the apparatus further comprises a means for determining which engine or combination of engines to use for a particular maneuver of the vehicle.

95. An apparatus for determining and assessing information to be collected from a set of information sources for a desired level of decision accuracy as set forth in claim 72, wherein the information sources provide information regarding resource allocation on a battlefield, and wherein the apparatus further comprises a means for using the information gathered to make recommendations regarding future resource allocation on the battlefield in order to optimize the use of resources on the battlefield.

96. An apparatus for determining and assessing information to be collected from a set of information sources for a desired level of decision accuracy as set forth in claim 72, where the user input is information to aid in solving a computer problem, and wherein the apparatus further comprises a means likely way to correct the problem.

* * * * *